(12) United States Patent
Gislason et al.

(10) Patent No.: US 6,878,669 B2
(45) Date of Patent: Apr. 12, 2005

(54) DESULFURIZATION AND SORBENT

(75) Inventors: Jason J. Gislason, Bartlesville, OK (US); Glenn W. Dodwell, Bartlesville, OK (US); Deborah K. Just, Bartlesville, OK (US); Robert W. Morton, Bartlesville, OK (US); Marvin M. Johnson, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 282 days.

(21) Appl. No.: 10/329,236

(22) Filed: Dec. 23, 2002

(65) Prior Publication Data

US 2004/0121906 A1 Jun. 24, 2004

(51) Int. Cl.$^7$ ................................................. B01J 20/10
(52) U.S. Cl. ....................................... 502/407; 502/412
(58) Field of Search ................................. 502/400, 401, 502/407, 408, 409, 410, 411, 412, 439, 424, 414

(56) References Cited

U.S. PATENT DOCUMENTS

| | | | |
|---|---|---|---|
| 5,958,830 A | 9/1999 | Khare et al. | 502/407 |
| 5,972,835 A | 10/1999 | Gupta | 502/439 |
| 6,150,300 A | 11/2000 | Khare et al. | 502/407 |
| 6,274,533 B1 | 8/2001 | Khare | 502/343 |

*Primary Examiner*—Stanley S. Silverman
*Assistant Examiner*—Edward M. Johnson
(74) *Attorney, Agent, or Firm*—Lynda S. Jolly (57) ABSTRACT

The attrition resistance of sorbent compositions are enhanced by acid-treating the perlite component of the sorbent. The efficiency of making a promoter metal-containing sorbent composition is enhanced using a novel method for incorporating the promoter metal into the sorbent.

54 Claims, 2 Drawing Sheets

DESULFURIZATION AND SORBENT

BACKGROUND OF THE INVENTION

This invention relates to a process of making a sorbent composition, a sorbent composition made by such process, and a process of using a sorbent composition for the removal of sulfur from a sulfur-containing fluid.

Hydrocarbon-containing fluids such as gasoline and diesel fuels typically contain a quantity of sulfur. High levels of sulfur in such automotive fuels are undesirable because oxides of sulfur present in automotive exhaust may irreversibly poison noble metal catalysts employed in automobile catalytic converters. Emissions from such poisoned catalytic converters may contain high levels of non-combusted hydrocarbons, oxides of nitrogen, and/or carbon monoxide, which, when catalyzed by sunlight, form ground level ozone, more commonly referred to as smog.

Much of the sulfur present in the final blend of most gasolines originates from a gasoline blending component commonly known as "cracked-gasoline." Thus, reduction of sulfur levels in cracked-gasoline will inherently serve to reduce sulfur levels in most gasolines, such as, automobile gasolines, racing gasolines, aviation gasolines, boat gasolines, and the like.

Many conventional processes exist for removing sulfur from cracked-gasoline. However, most conventional sulfur removal processes, such as hydrodesulfurization, tend to saturate olefins and aromatics in the cracked-gasoline and thereby reduce its octane number (both research and motor octane number). Thus, there is a need for a process wherein desulfurization of cracked-gasoline is achieved while the octane number is maintained.

In addition to the need for removing sulfur from cracked-gasoline, there is also a need to reduce the sulfur content in diesel fuel. In removing sulfur from diesel fuel by hydrodesulfurization, the cetane is improved but there is a large cost in hydrogen consumption. Such hydrogen is consumed by both hydrodesulfurization and aromatic hydrogenation reactions. Thus, there is a need for a process wherein desulfurization of diesel fuel is achieved without significant consumption of hydrogen so as to provide a more economical desulfurization process.

Traditionally, sorbent compositions used in processes for removing sulfur from sulfur-containing fluids, such as cracked-gasoline and diesel fuel, have been agglomerates utilized in fixed bed applications. Because fluidized bed reactors have advantages over fixed bed reactors, such as better heat transfer and better pressure drop, sulfur-containing fluids are sometimes processed in fluidized bed reactors. Fluidized bed reactors generally use reactants (e.g., sorbent compositions) that are in the form of relatively small particulates. The size of these particulates is generally in a range of from about 1 micron to about 10 millimeters. However, conventional reactant particulates generally do not have sufficient attrition resistance (i.e., resistance to physical deterioration) for all applications. Consequently, finding a sorbent with sufficient attrition resistance that removes sulfur from these sulfur-containing fluids and that can be used in fluidized, transport, moving, or fixed bed reactors is desirable and would be a significant contribution to the art and to the economy.

SUMMARY OF THE INVENTION

Accordingly, it is an object of the present invention to provide a novel method of making a sorbent composition which is suitable for removing sulfur from sulfur-containing fluids, such as cracked-gasoline and diesel fuels, and has enhanced attrition resistance.

A further object of this invention is to provide a sorbent composition having enhanced attrition resistance.

Another object of this invention is to provide a process for the removal of sulfur from sulfur-containing fluid streams which minimizes saturation of olefins and aromatics therein.

A yet further object of this invention is to provide a process for the removal of sulfur from sulfur-containing fluid streams which minimizes hydrogen consumption.

It should be noted that the above-listed objects need not all be accomplished by the invention claimed herein and other objects and advantages of this invention will be apparent from the following description of the preferred embodiments and appended claims.

Accordingly, in one embodiment of the present invention, a method of making a sorbent composition is provided. The method comprises the steps of: (a) contacting expanded, crushed perlite with an acid to thereby provide an acid-treated perlite; and (b) combining the acid-treated, expanded, crushed perlite with a zinc source, an aluminum source, and a promoter metal to thereby provide an unreduced sorbent.

In a further embodiment of the present invention, there is provided a sorbent composition comprising perlite, zinc oxide, and a reduced-valence promoter metal component. The sorbent composition has an Operational Jet Cup Attrition Index value of less than about 16.

In another embodiment of the present invention, there is provided a method of making a sorbent composition comprising the steps of: (a) reacting a promoter metal-containing compound with a zinc-containing compound under conditions sufficient to form a substitutional solid solution comprising a promoter metal and zinc; and (b) combining the substitutional solid solution with a zinc source and an aluminum source to thereby provide an unreduced sorbent.

In yet another embodiment of the present invention, there is provided a method of making a sorbent composition comprising the steps of: (a) admixing a solvent, a promoter metal, and an alumina to thereby form a wet mix; (b) admixing zinc oxide and perlite to thereby form a dry mix; (c) admixing the wet mix and the dry mix to thereby form a sorbent slurry; (d) particulating the sorbent slurry to thereby form sorbent particulates; (e) calcining the sorbent particulates to thereby form calcined sorbent particulates; and (f) reducing the calcined sorbent particulates to thereby form a reduced sorbent.

In still another embodiment of the present invention, there is provided a method of making a sorbent composition comprising the steps of: (a) admixing a solvent and an alumina to thereby form a wet mix; (b) admixing zinc oxide, an oxide of a promoter metal, and perlite to thereby form a dry mix; (c) admixing the wet mix and the dry mix to thereby form a sorbent slurry; (d) particulating the sorbent slurry to thereby form sorbent particulates; (e) calcining the sorbent particulates to thereby form calcined sorbent particulates; and (f) reducing the calcined sorbent particulates to thereby form a reduced sorbent.

DETAILED DESCRIPTION OF THE PREFERRED EMBODIMENTS

In accordance with a first embodiment of the present invention, a novel process for making a sorbent composition is provided. The process generally comprises the steps of: (a) contacting perlite with an acid to thereby provide an acid-treated perlite; (b) combining support components including the acid-treated perlite, a zinc source, an aluminum source, a solvent, and, optionally, a filler; (c) mixing the support components to provide a substantially homogeneous support mixture in the form of a slurry; (d) shaping the support mixture into support particulates by spray drying the support mixture into microspherical particles; (e) calcining the support particulates to thereby provide calcined support particulates having a zinc aluminate component formed from at least a portion of the zinc source and at least a portion of the aluminum source; (f) incorporating a promoter metal with the calcined support particulates by impregnation with an aqueous solution containing the promoter metal, thereby providing a promoted sorbent; (g) calcining the promoted sorbent to thereby provide a calcined promoted sorbent having an oxidized promoter metal component comprising a substitutional solid metal oxide solution characterized by the following formula: $M_XZn_YO$, wherein M is the promoter metal and X and Y are numerical values in the range of from 0.01 to 0.99; (h) reducing the calcined promoted sorbent to thereby provide a reduced sorbent having a reduced-valence promoter metal component comprising a substitutional solid metal solution characterized by the following formula: $M_AZn_B$, wherein M is the promoter metal and A and B are numerical values in the range of from about 0.01 to about 0.99.

The perlite employed in step (a), described above, is preferably expanded perlite formed from a siliceous volcanic rock (i.e., crude perlite) that has been heated to a temperature above about 1,600° F. to thereby cause expansion of the rock to a size that is at least four times its initial size. Crude perlite rock expands (typically four to 20 times its original size) at high temperatures due to the presence of water in the rock. When the crude perlite is heated above about 1,600° F., the water in the rock vaporizes and creates numerous tiny bubbles in the heat-softened glassy particles. These diminutive glass-sealed bubbles are then crushed into curved pieces which account for the low density of expanded perlite. Expanded perlite typically has a density in the range of from about one to about 15 pounds per cubic foot, more typically two to six pounds per cubic foot. An elemental analysis of expanded perlite typically shows the following components in approximately the following amounts: silicon, 33.8%; aluminum, 7.2%; potassium, 3.5%; sodium, 3.4%; iron, 0.6%; calcium, 0.6%; magnesium, 0.2%; oxygen (by difference), 47.5%; and bound water, 3.0%. Preferably, the perlite employed in the present invention comprises the above-listed components in amounts within about 25 percent of the above-listed amounts, more preferably in amounts within 10 percent of the above-listed amounts.

The expanded perlite is preferably subjected to crushing or milling to reduce the particle size of the perlite prior to implementation in the present invention. It is preferred for the perlite employed in step (a) to have a mean particle size in the range of from about five to about 75 microns, more preferably in the range of from about 20 to about 50 microns, and most preferably in the range of from 30 to 40 microns. Preferably, the amount of the perlite having a particle size of more than 75 microns is less than about 30 weight percent, more preferably less than about 15 weight percent, and most preferably less than five weight percent. Preferably, the amount of the perlite having a particle size of less than 2 microns is less than about 30 weight percent, more preferably less than about 15 weight percent, and most preferably less than five weight percent.

The acid contacted with the perlite in step (a), described above, can be any suitable organic or inorganic acid that can alter the perlite in a manner such that the attrition resistance of the resulting calcined promoted sorbent composition is enhanced. Suitable inorganic acids include, for example, nitric acid, hydrochloric acid, sulfuric acid, and phosphoric acid. Suitable organic acids include, for example, chloroacetic acid, trichloroacetic acid, maleic acid, malonic acid, and oxalic acid. Preferably, the acid is an inorganic acid having a concentration of about ten percent or less. Most preferably, the acid is nitric acid having a concentration of about five percent. The perlite and acid can be contacted with one another by any suitable means known in the art including, for example, by dipping the perlite into the acid, by extensively washing the perlite with the acid, or by submerging the perlite in the acid. Preferably, the perlite and the acid are contacted with one another for a time period in the range of from about 30 seconds to about 60 minutes, most preferably in the range of from about one minute to about 20 minutes. It is preferred that the resulting acid-treated perlite substantially retains the micropores (<500 angstroms) originally present and that the acid does not etch the perlite to any appreciable degree. It is further preferred that the acid treatment does not create any appreciable amount of new macropores (>500 angstroms).

Though not wishing to be bound by theory, the inventors postulate that the acid treatment of perlite results in a final sorbent composition having enhanced attrition resistance due to the increased binding strength between the acid-treated perlite particles and the alumina. It is believed that the acid treatment of the perlite significantly increases the number of hydroxyl groups on the surface of the particle which can result in a strong bind between the acid-treated perlite and alumina upon calcination.

The zinc source employed in step (b), described above, can be any zinc-containing compound. Preferably, the zinc source is in the form of zinc oxide or one or more zinc compounds that are convertible to zinc oxide. Most preferably, the zinc source is in the form of a powdered zinc oxide. The zinc source, preferably powdered zinc oxide, will generally be present in the support mixture in an amount in the range of from about 2 to about 70 weight percent based on a total weight of the support mixture, more preferably in the range of from about 5 to about 50 weight percent, and most preferably in the range of from 10 to 45 weight percent.

The aluminum source employed in step (b), described above, can be any aluminum-containing carrier compound. The aluminum source can be any suitable commercially available alumina material including, but not limited to, colloidal alumina solutions, hydrated aluminas, peptized aluminas, and, generally, those alumina compounds produced by the dehydration of alumina hydrates. The preferred alumina source is a hydrated alumina such as, for example, boehmite or pseudoboehmite. The aluminum source, preferably a hydrated alumina, will generally be present in the support mixture in an amount such that the weight ratio of the zinc source to the aluminum source in the support mixture is in the range of from about 0.1:1 to about 20:1, more preferably in the range of from about 1:1 to about 10:1, and most preferably in the range of from 2:1 to 6:1.

The perlite employed in step (a), described above, should be present in the support mixture in an amount such that the weight ratio of the zinc source to the perlite is in the range of from about 0.5:1 to about 20:1, more preferably in the range of from 1:1 to about 10:1, and most preferably in the range of from 2:1 to 6:1.

The solvent employed in step (b), described above, can be any liquid added to the support mixture to help form a support mixture having an optimum consistency for shaping, preferably by spray drying. The most preferred solvent is distilled water. The solvent, preferably distilled water, should be present in the support mixture in an amount such that the weight ratio of the zinc source to the solvent is in the range of from about 0.05:1 to about 2:1, more preferably in the range of from about 0.1:1 to about 1.5:1, and most preferably in the range of from 0.2:1 to 1:1. When a filler is employed in step (b), described above, the filler can be any compound which enhances the ability of the support mixture to be spray dried. Preferably, the filler is a clay such as, for example, kaolin clay. When the support mixture includes a filler, preferably kaolin clay, the filler should be present in the support mixture in an amount which provides a weight ratio of the zinc source to the filler in the range of from about 0.1:1 to about 20:1, more preferably in the range of from about 1:1 to about 10:1, and most preferably in the range of from 2:1 to 6:1.

In accordance with step (c), described above, the combined support components are generally mixed by any suitable method or manner which provides for the intimate mixing of such components to thereby provide a substantially homogeneous mixture of the support components. Any suitable means for mixing the support components can be used to achieve the desired dispersion of such components. Examples of suitable mixing means include, but are not limited to, mixing tumblers, stationery shells or troughs. Muller mixers, which are of the batch or continuous type, impact mixers, and the like. It is presently preferred to use a Muller mixer in the mixing of the support components. The support components are admixed to provide a resulting support mixture which can be in the form selected from the group consisting of a wet mix, a dough, a paste, a slurry, and the like.

In accordance with step (d), described above, the resulting support mixture can then be shaped to form a particulate(s) selected from the group consisting of a granulate, an extrudate, a tablet, a sphere, a pellet, a microsphere, and the like. Preferably, the support mixture is in the form of a slurry, and the shaping of the slurry into particulates is achieved by spray drying the slurry to form microspheres having a mean particle size generally in the range of from about 10 microns to about 300 microns, preferably in the range of from about 40 microns to about 150 microns, and most preferably in the range of from 50 to 100 microns. Spray drying is known in the art and is discussed in *Perry's Chemical Engineers Handbook,* 6th Edition, published by McGraw-Hill, Inc. at pages 20–58. Additional information can be obtained from the *Handbook of Industrial Drying,* published by Marcel Dekker, Inc. at pages 243–293.

After shaping, preferably spray drying, the support particulates are preferably dried and calcined in accordance with step (e), described above. Any drying method(s) known to one skilled in the art such as, for example, air drying, heat drying, vacuum drying, and the like and combinations thereof, can be used. Preferably, the support particulates are dried at a temperature in the range of from about 180° F. to about 400° F., more preferably in the range of from 200° F. to 350° F. The pressure employed during drying of the support particulates can be in the range of from about atmospheric (i.e., 14.7 pounds per square inch absolute) to about 150 pounds per square inch absolute (psia), more preferably in the range of from about atmospheric to about 100 psia, and most preferably about atmospheric, so long as the desired temperature can be maintained. Any suitable period for drying the support particulates can be employed. Preferably, the drying of the support particulates takes place during a time period in the range of from about 0.5 hour to about 60 hours, more preferably in the range of from one hour to 20 hours.

The calcining of the dried support particulates can be performed in an oxygen environment at a calcination temperature in the range of from about 400° F. to about 1800° F., more preferably in the range of from about 600° F. to about 1600° F., and most preferably in the range of from 800° F. to 1500° F. The calcination pressure is preferably in the range of from about seven psia to about 750 psia, more preferably in the range of from about seven psia to about 450 psia, and most preferably in the range of from seven psia to 150 psia. The time period for the calcination of the dried support particulates is generally in the range of from about one hour to about 60 hours, more preferably in the range of from about 1.5 hours to about 20 hours, and most preferably in the range of from two hours to 15 hours.

During calcination of the support particulates, at least a portion of the zinc source and at least of portion of the aluminum source chemically combine to form a spinel structure similar to zinc aluminate ($ZnAl_2O_4$). The zinc aluminate may not be stoichiometrically pure. The calcined support particulates preferably comprise zinc aluminate in an amount in the range of from about two to about 40 weight percent based on the total weight of the calcined support particulates, more preferably in the range of from about five to about 30 weight percent, and most preferably in the range of from 10 to 20 weight percent.

In accordance with step (f), described above, the resulting calcined support particulates can then be contacted with a promoter metal source to thereby incorporate the promoter metal with the calcined support particulates. The promoter metal can be at least one metal selected from the group consisting of nickel, cobalt, iron, manganese, tungsten, silver, gold, copper, platinum, zinc, tin, ruthenium, molybdenum, antimony, vanadium, iridium, chromium, palladium, and rhodium. Preferably, the promoter metal is selected from the gouop consisting of nickel, cobalt and mixtures thereof; most preferably, for best sulfur removal, the promoter metal is nickel. The promoter metal may be incorporated on, in, or with the calcined support particulates by any suitable means or method known in the art such as, for example, impregnating, soaking, spraying, and combinations thereof. The preferred method of incorporating the promoter metal with the calcined support particulates is impregnating using standard incipient wetness impregnation techniques. A preferred impregnation method employs an impregnation solution comprising the desired concentration of the promoter metal so as to ultimately provide a promoted sorbent comprising the desired quantity of the promoter metal. The impregnation solution can be an aqueous solution formed by dissolving the promoter metal source in a solvent, preferably water. It is acceptable to use somewhat of an acidic solution to aid in the dissolution of the promoter metal source. It is most preferred for the calcined support particulates to be impregnated with the promoter metal by using a solution containing nickel nitrate hexahydrate dissolved in water.

Generally, the amount of the promoter metal incorporated, preferably impregnated, onto, into or with the calcined support particulates, is an amount which provides, after the promoted sorbent particulate material has been dried and calcined, a promoted sorbent composition comprising the promoter metal in an amount in the range of from about one to about 60 weight percent promoter metal based on the total weight of the promoted sorbent, more preferably an amount in the range of from about five to about 50 weight percent promoter metal, and most preferably in an amount in the range of from 10 to 40 weight percent promoter metal. It may be necessary to employ one or more incorporation steps in order to incorporate the desired quantity of the promoter metal with the calcined support particulates. If so, such additional incorporation(s) are performed in substantially the same manner as described above.

Once the promoter metal has been incorporated on, in, or with the calcined support particulates, the promoted sorbent particulates are then dried and calcined in accordance with step (g), described above. The drying and calcining of the promoted sorbent particulates can be accomplished by any suitable method(s) known in the art. Preferably, the drying and calcining of the promoted sorbent particulates is performed in substantially the same manner and under substantially the same conditions as previously described in step (e) with reference to the drying and calcining of the unpromoted support particulates.

When the promoted sorbent particulates are calcined, at least a portion of the promoter metal and at least a portion of the zinc oxide present in the promoted sorbent chemically combine to form an oxidized promoter metal component. Preferably, the oxidized promoter metal component comprises, consists essentially of, or consists of a substitutional solid metal oxide solution characterized by the formula: $M_X Zn_Y O$, wherein M is the promoter metal and X and Y are each numerical values in the range of from about 0.01 to about 0.99. In the above formula, it is preferred for X to be in the range of from about 0.5 to about 0.9 and most preferably from 0.6 to 0.8. It is further preferred for Y to be in the range of from about 0.1 to about 0.5, and most preferably from 0.2 to 0.4. Preferably, Y is equal to (1−X).

Substitutional solid solutions have unique physical and chemical properties that are important to the chemistry of the sorbent composition described herein. Substitutional solid solutions are a subset of alloys that are formed by the direct substitution of the solute metal for the solvent metal atoms in the crystal structure. For example, it is believed that the substitutional solid metal oxide solution ($M_X Zn_Y O$) found in the oxidized (i.e., unreduced), calcined sorbent composition made by the process of the present invention is formed by the solute zinc metal atoms substituting for the solvent promoter metal atoms. There are three basic criteria that favor the formation of substitutional solid solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc oxide employed in the inventive sorbent composition preferably meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc oxide solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 70:30 nickel zinc oxide solid solution ($Ni_{0.7}Zn_{0.3}O$) that is formed during oxidation (i.e., calcination or regeneration) and microscopically in the repeated regenerability of the sorbent.

During calcination of the promoted sorbent particulates, at least a portion of the promoter metal combines with at least a portion of the zinc aluminate to form a promoter metal-zinc aluminate substitutional solid solution characterized by the formula: $M_Z Zn_{(1-Z)} Al_2 O_4$, wherein Z is a numerical value in the range of from 0.01 to 0.99.

The calcined promoted sorbent particulates preferably comprise zinc oxide, the oxidized promoter metal component ($M_X Zn_Y O$), the acid-treated, expanded, crushed perlite, and the promoter metal-zinc aluminate ($M_Z Zn_{(1-Z)} Al_2 O_4$) in the ranges provided below in Table 1.

TABLE 1

Components of the Calcined Promoted Sorbent Particulates

| Range | ZnO (wt %) | $M_X Zn_Y O$ (wt %) | Perlite (wt %) | $M_Z Zn_{(1-Z)} Al_2 O_4$ (wt %) |
|---|---|---|---|---|
| Preferred | 5–80 | 5–70 | 5–50 | 1–50 |
| More Preferred | 20–60 | 15–60 | 10–40 | 5–30 |
| Most Preferred | 30–50 | 20–40 | 15–30 | 10–20 |

In accordance with step (h), described above, the calcined promoted sorbent particulates are thereafter subjected to reduction with a suitable reducing agent, preferably hydrogen, under reducing conditions, to thereby provide a reduced sorbent composition. Reduction can be carried out at a temperature in the range of from about 100° F. to about 1500° F. and a pressure in the range of from about 15 psia to about 1500 psia. Such reduction can be carried out for a time period sufficient to achieve the desired level of reduction, generally a time period in the range of from about 0.1 hour to about 20 hours.

During reduction of the calcined promoted sorbent particulates, at least a portion of the oxidized promoter metal component is reduced to provide a reduced-valence promoter metal component. Preferably, the reduced-valence promoter metal component comprises, consists essentially of, or consists of a substitutional solid metal solution characterized by the formula: $M_A Zn_B$, wherein M is the promoter metal and A and B are numerical values in the range of from about 0.01 to about 0.99. In the above formula for the substitutional solid metal solution, it is preferred for A to be in the range of from about 0.70 to about 0.97, more preferably in the range of from about 0.80 to about 0.95, and most preferably in the range of from about 0.90 to about 0.94. It is further preferred for B to be in the range of from about 0.03 to about 0.30, more preferably in the range of from about 0.05 to about 0.20, and most preferably in the range of from about 0.06 to 0.10. Preferably, B is equal to (1−A). As used herein, the term "reduced-valence promoter metal component" shall denote a promoter metal-containing component that initially had one or more oxygen atoms associated with it, but now has a reduced number of oxygen atoms associated with it due to reduction. Preferably, a substantial portion of the reduced-valence promoter metal component has no oxygen atoms associated with it.

The reduced sorbent particulates preferably comprise zinc oxide, the reduced-valence promoter metal component ($M_AZn_B$), the acid-treated perlite, and the promoter metal-zinc aluminate substitutional solid ($M_ZZn_{(1-Z)}Al_2O_4$) in the ranges provided below in Table 2.

TABLE 2

Components of the Reduced Sorbent Particulates

| Range | ZnO (wt %) | $M_AZn_B$ (wt %) | Perlite (wt %) | $M_ZZn_{(1-Z)}Al_2O_4$ (wt %) |
|---|---|---|---|---|
| Preferred | 5–80 | 5–80 | 5–50 | 1–50 |
| More Preferred | 20–60 | 20–60 | 10–40 | 5–30 |
| Most Preferred | 30–50 | 30–40 | 20–30 | 10–20 |

The physical properties of the reduced sorbent particulates significantly affect its suitability for use in the desulfurization process, described in detail below. Important physical properties of the reduced sorbent particulates include, for example, particle shape, particle size, particle density, and resistance to attrition.

The reduced sorbent particulates preferably have high resistance to attrition. As used herein, the term "attrition resistance" denotes a measure of a particle's resistance to size reduction under controlled conditions of turbulent motion. The attrition resistance of a particle can be quantified using the jet cup attrition test, similar to the Davison Index. The Jet Cup Attrition Index represents the weight percent of the over 44 micrometer ($\mu$) particle size fraction which is reduced to particle sizes of less than 37 micrometers under test conditions and involves screening a 5 gram sample of sorbent to remove particles in the 0 to 44 micrometer size range. The particles above 44 micrometers are then subjected to a tangential jet of air at a rate of 21 liters per minute introduced through a 0.0625 inch orifice fixed at the bottom of a specially designed jet cup (1" I.D.×2" height) for a period of 1 hour. The jet cup attrition test is calculated as follows:

$$DI = \frac{\text{Wt. of 0-37 Micrometer Formed During Test}}{\text{Wt. of Original} + 44 \text{ Micrometer Fraction Being Tested}} \times$$

$$100 \times \text{Correction Factor}$$

The Correction Factor (presently 0.3) is determined by using a known calibration standard to adjust for differences in jet cup dimensions and wear. The solid sorbent particulates employed in the present invention preferably have a jet cup attrition index value of less than of less than about 20, more preferably less than about 15, still more preferably less than about 12, and most preferably less than 10.

An important aspect of the present invention is that the Jet Cup Attrition Index value of the inventive sorbent prepared with acid-treated perlite remains in the desired range, even after being employed to remove sulfur from a hydrocarbon fluid. Many conventional sorbents have a tendency to "soften" after reaction and/or regeneration, but the inventive sorbent substantially maintains its hardness and attrition resistance over multiple cycles of desulfurization, regeneration, and reduction. One way to quantify such resistance to softening during operation is known as an "Operational Jet Cup Attrition Index." The Operational Jet Cup Attrition Index of a sorbent is simply the Jet Cup Attrition Index of the sorbent, measured after a certain repeated reduction/oxidation (redox) procedure described in detail below. The repeated redox procedure is designed to simulate the conditions which the sorbent would be exposed to in an actual desulfurization unit, such as desulfurization unit 10 illustrated in FIG. 1.

Figure 2:
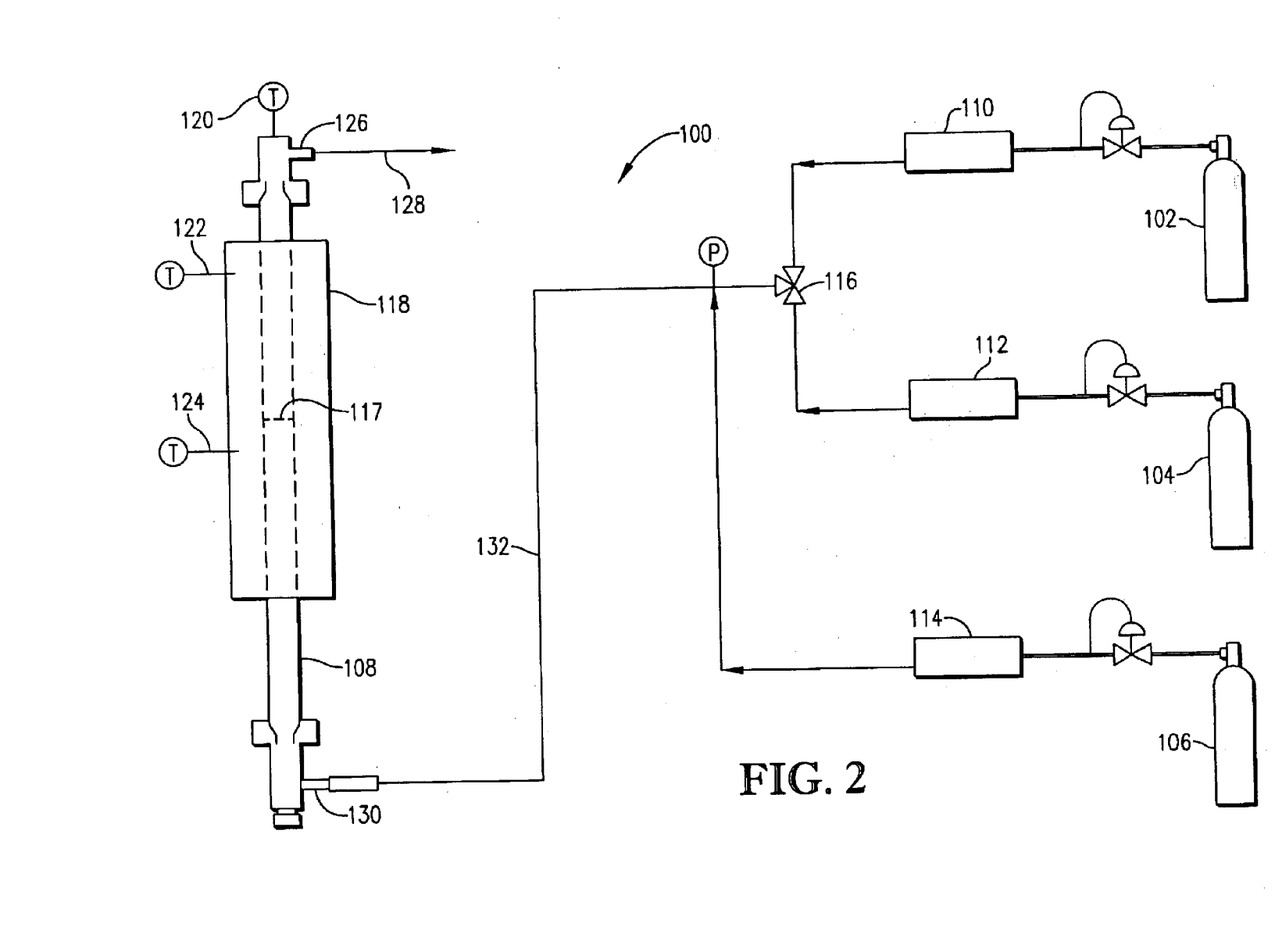
FIG. 2 is a schematic diagram of a system used in determining the Operational Jet Cup Attrition Index of a sorbent composition.

Referring to FIG. 2, a redox test system 100 generally includes a hydrogen source 102, an air source 104, a nitrogen source 106, and a reactor tube 108. Three mass flow controllers 110, 112, 114 control the flow rate of hydrogen, air, and nitrogen, respectively, through reactor tube 108. The hydrogen and air pass through a manual three-way valve 116, which prevents both hydrogen and air from flowing to reactor tube 108 at the same time. Reactor tube 108 is a 26-inch quartz reactor tube containing a three-inch upper section with a 0.5-inch outer diameter (O.D.), a 20-inch reactor section (one-inch O.D.) with a glass frit 117 centered in the reactor section, and a three-inch lower section (0.5-inch O.D.). Reactor tube 108 is positioned in a 15-inch long clam shell furnace 118. A thermocouple 120 is disposed at the upper end of reactor tube 108 and extends down into reactor tube 108, three inches above the glass frit 117. Thermocouple 120 is connected to a temperature readout and is not temperature controlling. Two temperature controlling thermocouples 122, 124 are connected through the side of two-zone clam shell furnace 118. A side port 126 at the top of reactor tube 108 is fluidly coupled to a vent line 128. An inlet port 130 of reactor tube 108 is fluidly coupled to hydrogen, air, and nitrogen sources 102, 104, 106 via a supply line 132.

To perform the repeated redox procedure in redox test system 100, the sorbent particulates are first screened to remove particles smaller than 325 mesh and larger than 100 mesh. A ten gram quantity of the screen sorbent particulates is then loaded on the top of the glass frit 117 through the top of reactor tube 108. Nitrogen is then turned on at 200 standard cubic centimeters per minute (SCCM) and reactor tube 108 is purged with nitrogen for 15 minutes. Reactor tube 108 is then heated to 800° F. in flowing nitrogen for 15 minutes. The nitrogen flow is then stopped and the hydrogen flow rate is set to 300 SCCM. The sorbent is allowed to reduce in flowing hydrogen for one hour. The hydrogen flow is then stopped, and nitrogen is set to flow at 200 SCCM for 15 minutes while reactor tube 108 is heated to 950° F. The nitrogen flow is then stopped and air is turned on to 100 SCCM and the sorbent is allowed to oxidize for one hour. The air is then shut off and nitrogen is allowed to purge reactor tube 108 for 15 minutes at 200 SCCM. The above purge, reduction, purge, oxidation, and purge steps are then repeated two more times for a total of three redox cycles. After the three redox cycles, the nitrogen is stopped and the hydrogen flow rate is set to 300 SCCM and the sorbent is allowed to reduce for one hour. The hydrogen flow is then stopped and nitrogen set to a flow at 200 SCCM for 15 minutes. The nitrogen flow is then stopped and reactor tube 108 is allowed to cool to ambient temperature. The sorbent, having been subjected to 3.5 redox cycles, is then removed from reactor tube 108 and the Jet Cup Attrition Index of this sorbent is determined in the manner described above. The resulting Jet Cup Attrition Index of the "aged" sorbent subjected to 3.5 redox cycles is the "Operational Jet Cup Attrition Index."

It has been discovered that a sorbent employing acid-treated perlite has a lower Operational Jet Cup Attrition Index (improved attrition resistance) than a sorbent employing untreated perlite. It is preferred for the inventive reduced sorbent particulates (comprising acid-treated perlite) to have an Operational Jet Cup Attrition Index value of less than about 20, more preferably less than about 15, still more preferably less than about 13, and most preferably less than 12.

It has also been discovered that the difference between the Jet Cup Attrition Index of a freshly prepared sorbent and the Operational Jet Cup Attrition Index of the aged sorbent is much less for sorbents employing acid-treated perlite than for sorbents employing untreated perlite. Such a minimal reduction in Jet Cup Attrition Index during operation indicates that the sorbent employing acid-treated perlite does not soften as much as the untreated sorbent during use. Preferably, the Operational Jet Cup Attrition Index value of the inventive sorbent (employing acid-treated perlite) is within 50 percent of the Jet Cup Attrition Index value for that sorbent in its freshly prepared state (i.e., the "Fresh" Jet Cup Attrition Index), more preferably Operational Jet Cup Attrition Index value and "Fresh" Jet Cup Attrition Index value are within about 30 percent of each other, more preferably within about 20 percent, still more preferably within about 10 percent, and most preferably within 7.5 percent.

The reduced sorbent particulates preferably comprise substantially microspherical particles having a mean particle size in the range of from about 10 to about 300 microns, more preferably in the range of from about 40 to 150 microns, and most preferably in the range of from 50 to 100 microns. The density of the sorbent particulates is preferably in the range of from about 0.5 to about 1.5 grams per cubic centimeter (g/cc), more preferably in the range of from about 0.8 to about 1.3 g/cc, and most preferably in the range of from 0.9 to 1.2 g/cc. The particle size and density of the sorbent particulates preferably qualify the sorbent particulates as a Group A solid under the Geldart group classification system described in *Powder Technol.*, 7, 285–292 (1973).

In accordance with a second embodiment of the present invention, a novel process for making a sorbent composition is provided. The process generally comprises the steps of: (aa) reacting a promoter metal-containing compound with a zinc-containing compound under conditions sufficient to form a substitutional solid solution comprising the promoter metal and zinc; (bb) combining support components including the substitutional solid solution, a zinc source, an aluminum source, perlite, a solvent, and, optionally, a filler; (cc) mixing the support components to provide a substantially homogenous support mixture in the form of a slurry; (dd) shaping the support mixture into support particulates by spray drying the support mixture into microspherical particles; (ee) calcining the support particulates to thereby provide a calcined promoted sorbent having an oxidized promoter metal component comprising a substitutional solid metal oxide solution characterized by the following formula: $M_X Zn_Y O$, wherein M is the promoter metal and X and Y are numerical values in the range of from 0.01 to 0.99; and (ff) reducing the calcined promoted sorbent to thereby provide a reduced sorbent having a reduced-valence promoter metal component comprising a substitutional solid metal solution characterized by the following formula: $M_A Zn_B$, wherein M is the promoter metal and A and B are numerical values in the range of from about 0.01 to about 0.99.

The promoter metal-containing compound employed in step (aa), described above, can be any compound comprising the promoter metal (described above in the first embodiment of the present invention) and capable of being reacted with the zinc-containing compound to form a substitutional solid solution comprising the promoter metal and zinc. Preferably, both the promoter metal-containing compound and the zinc-containing compound are acetates. Most preferably, the promoter metal-containing compound is nickel acetate tetrahydrate and the zinc-containing compound is zinc acetate dihydrate. The amounts of the promoter metal-containing compound and zinc-containing compound employed in step (aa) are preferably such that the molar ratio of nickel to zinc is in the range of from about 0.5:1 to about 10:1, more preferably in the range of from about 1:1 to about 4:1, and most preferably in the range of from about 2:1 to about 3:1. The promoter metal-containing compound and zinc-containing compound can be reacted with one another using any suitable method known in the art for producing a substitutional solid solution comprising the promoter metal and zinc. Preferably, the promoter metal-containing compound and zinc-containing compound are reacted with one another by first mixing the two compounds under heated conditions, and thereafter calcining the mixture under calcining conditions, described above.

The substitutional solid solution formed by the reaction of the promoter metal-containing compound and the zinc-containing compound is preferably a substitutional solid metal oxide solution characterized by the formula: $M_X Zn_Y O$, wherein M is the promoter metal and X and Y are numerical values in the range of from 0.01 to 0.99. In the above formula, it is preferred for X to be in the range of from about 0.5 to about 0.9, more preferably from 0.6 to 0.8, and most preferably about 0.7. It is further preferred for Y to be in the range of from about 0.1 to about 0.5, more preferably from 0.2 to 0.4, and most preferably about 0.3. Preferably, Y is equal to (1−X).

The zinc source, aluminum source, perlite, solvent, and filler employed in step (bb), described above, can be the same compounds described in step (b) of the first embodiment of the present invention. Steps (bb)–(ff) can be performed in any manner known in the art that provides a resulting reduced sorbent having components and properties substantially similar to those of the reduced sorbent described above in the first embodiment of the present invention. Preferably, steps (bb)–(ff) are carried out in a manner similar to that disclosed in the first embodiment of the present invention.

In accordance with a third embodiment of the present invention, a novel process for making a sorbent composition is provided. The process generally comprises the steps of: (aaa) admixing an aluminum source, a solvent, and a soluble promoter metal to thereby form a wet mix; (bbb) admixing a zinc source, perlite, and optionally, a filler to thereby form a dry mix; (ccc) admixing the wet mix and the dry mix to thereby form a sorbent slurry; (ddd) shaping the sorbent slurry into sorbent particulates by spray drying the sorbent slurry into microspherical particles; (eee) calcining the sorbent particulates to thereby form calcined sorbent particulates having an oxidized promoter metal component comprising a substitutional solid metal oxide solution characterized by the following formula: $M_X Zn_Y O$, wherein M is the promoter metal and X and Y are numerical values in the range of from 0.01 to 0.99; and (fff) reducing the calcined sorbent particulates to thereby form a reduced sorbent having a reduced-valence promoter metal component comprising a substitutional solid solution characterized by the following formula: $M_A Zn_B$, wherein M is the promoter metal and A and B are numerical values in the range of from about 0.01 to about 0.99.

The zinc source, aluminum source, solvent, perlite, and filler employed in steps (aaa) and (bbb), described above, can be the same compounds described in the first embodiment of the present invention. The soluble promoter metal employed in step (aaa), described above, can be any compound containing the promoter metal (preferably nickel) that can be dissolved in the wet mix. Preferably, the soluble promoter metal is a nitrate. Most preferably, the soluble promoter metal is nickel nitrate. It is preferred for the pH of the wet mix and the sorbent slurry to be maintained below five at all times.

The proportional amounts of the zinc source, aluminum source, perlite, solvent, and, optionally, filler employed in steps (aaa) and (bbb), described above, are preferably amounts which yield a sorbent slurry in step (ccc) having a ratio of such components that is substantially the same as the support mixture described in step (c) of the first embodiment of the present invention. The particulating, calcining, and reducing of steps (ddd), (eee), and (fff) can be performed in substantially the same manner described above in the first embodiment of the present invention. The composition of the reduced sorbent produced in step (fff) is preferably substantially the same as the composition of the reduced sorbent provided in step (h) of the first embodiment of the present invention.

In accordance with a fourth embodiment of the present invention, a novel process for making a sorbent composition is provided. The process generally comprises the steps of: (aaaa) admixing a solvent and an aluminum source to thereby form a wet mix; (bbbb) admixing a zinc source, an oxide of a promoter metal, perlite, and, optionally, a filler to thereby form a dry mix; (cccc) admixing the wet mix and the dry mix to thereby form a sorbent slurry; (dddd) shaping the sorbent slurry into sorbent particulates by spray drying the sorbent slurry into microspherical particles; (eeee) calcining the sorbent particulates to thereby form calcined sorbent particulates having an oxidized promoter metal component comprising a substitutional solid metal oxide solution characterized by the following formula: $M_XZn_YO$, wherein M is the promoter metal and X and Y are numerical values in the range of from 0.01 to 0.99; and (ffff) reducing the calcined sorbent particulates to thereby form a reduced sorbent having a reduced-valence promoter metal component comprising a substitutional solid solution characterized by the following formula: $M_AZn_B$, wherein M is the promoter metal and A and B are numerical values in the range of from about 0.01 to about 0.99.

The zinc source, aluminum source, solvent, perlite, and filler employed in steps (aaaa) and (bbbb), described above, can be the same compounds described in the first embodiment of the present invention. It is preferred for the pH of the wet mix and the sorbent slurry to be maintained below six at all times.

The proportional amounts of the zinc source, aluminum source, perlite, solvent, and, optionally, filler employed in steps (aaaa) and (bbbb), described above, are preferably amounts which yield a sorbent slurry in step (cccc) having a ratio of such components that is substantially the same as the support mixture described in step (c) of the first embodiment of the present invention. The particulating, calcining, and reducing of steps (dddd), (eeee), and (ffff) can be performed in substantially the same manner described above in the first embodiment of the present invention. The composition of the reduced sorbent produced in step (ffff) is preferably substantially the same as the composition of the reduced sorbent provided in step (h) of the first embodiment of the present invention.

It should be noted that various combinations of the sorbent preparation procedures described in the first, second, third, and fourth embodiments of the present invention can be employed to produce the desired reduced sorbent composition having high attrition resistance and high desulfurization activity. For example, the acid-treated perlite described in the first embodiment of the present invention can be employed as the perlite component of the second, third, and fourth embodiments of the present invention. Further, the methods of incorporating the promoter metal described in the second, third, and fourth embodiments of the present invention can eliminate the metal impregnating step described in the first embodiment of the present invention.

In accordance with another embodiment of the present invention, a sorbent composition prepared in accordance with one, or a combination, of the above-described procedures can be employed in a desulfurization unit to remove sulfur from a sulfur-containing fluid.

Figure 1:
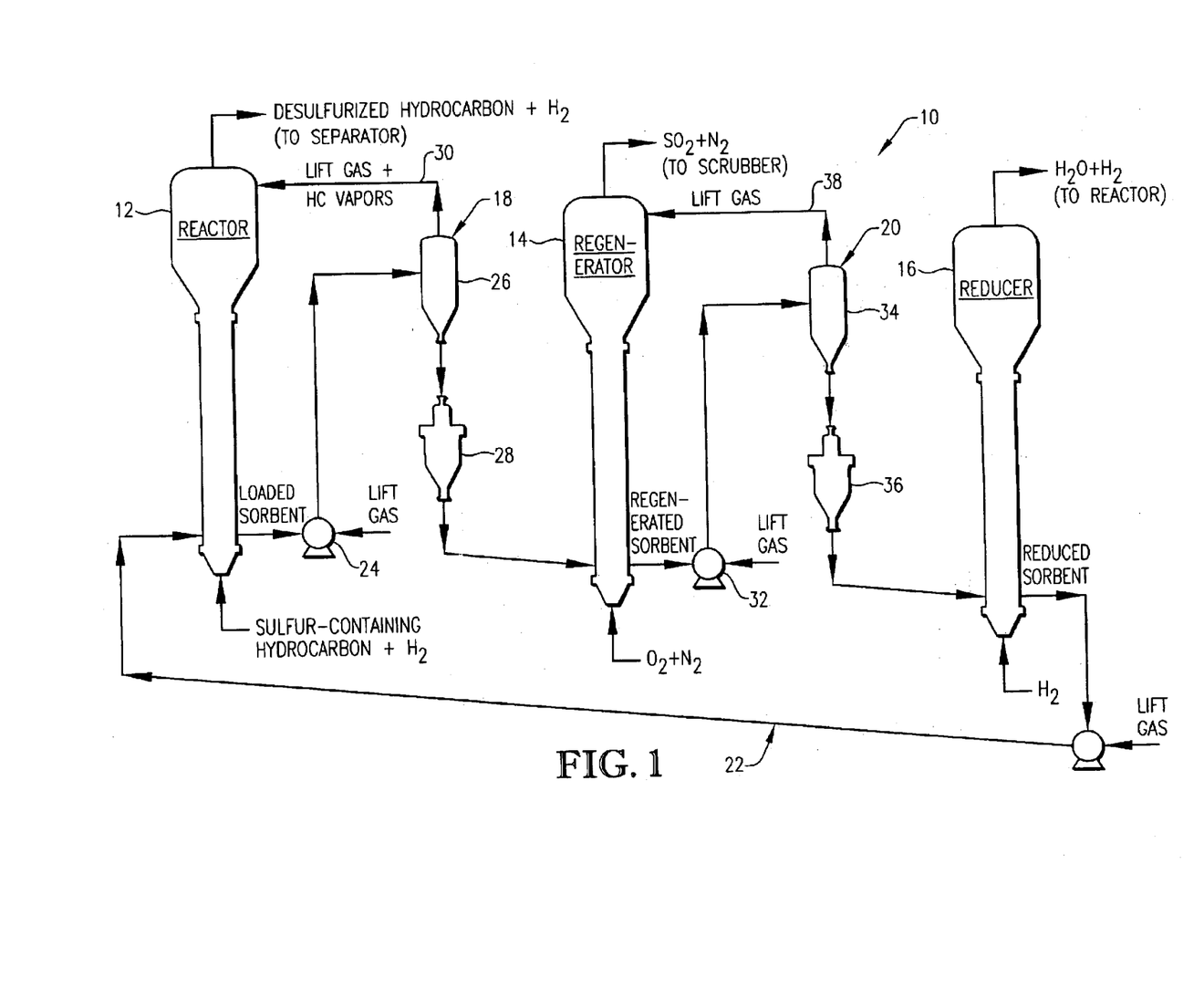
FIG. 1 is a schematic diagram of a desulfurization unit, particularly illustrating the circulation of regenerable solid sorbent particulates through a reactor, a regenerator, and a reducer.

Referring to FIG. 1, a desulfurization unit 10 is illustrated as generally comprising a fluidized bed reactor 12, a fluidized bed regenerator 14, and a fluidized bed reducer 16. Solid sorbent particulates are circulated in desulfurization unit 10 to provide for substantially continuous sulfur removal from a sulfur-containing hydrocarbon, such as cracked-gasoline or diesel fuel. The sorbent particulates employed in desulfurization unit 10 are preferably sorbent particulates made by the sorbent preparation process described above in the first embodiment of the present invention.

In fluidized bed reactor 12, a hydrocarbon-containing fluid stream is passed upwardly through a bed of the reduced sorbent particulates. The reduced sorbent particulates contacted with the hydrocarbon-containing stream in reactor 12 preferably initially (i.e., immediately prior to contacting with the hydrocarbon-containing fluid stream) comprise perlite, zinc oxide, and the reduced-valence promoter metal component. Though not wishing to be bound by theory, it is believed that the reduced-valence promoter metal component of the reduced sorbent particulates facilitates the removal of sulfur from the hydrocarbon-containing stream, while the zinc oxide operates as a sulfur storage mechanism via its conversion to zinc sulfide. The reduced-valence promoter metal component has a valence which is less than the valence of the promoter metal component in its common oxidized state. More specifically, the reduced sorbent particulates employed in reactor 12 should include a promoter metal component having a valence which is less than the valence of the promoter metal component of the regenerated (i.e., oxidized) sorbent particulates exiting regenerator 14.

The hydrocarbon-containing fluid stream contacted with the reduced sorbent particulates in reactor 12 preferably comprises a sulfur-containing hydrocarbon and hydrogen. The molar ratio of the hydrogen to the sulfur-containing hydrocarbon charged to reactor 12 is preferably in the range of from about 0.1:1 to about 3:1, more preferably in the range of from about 0.2:1 to about 1:1, and most preferably in the range of from 0.4:1 to 0.8:1. Preferably, the sulfur-containing hydrocarbon is a fluid which is normally in a liquid state at standard temperature and pressure, but which exists in a gaseous state when combined with hydrogen, as described above, and exposed to the desulfurization conditions in reactor 12. The sulfur-containing hydrocarbon preferably can be used as a fuel or a precursor to fuel. Examples of suitable sulfur-containing hydrocarbons include cracked-gasoline, diesel fuels, jet fuels, straight-run naphtha, straight-run distillates, coker gas oil, coker naphtha, alkylates, and straight-run gas oil. Most preferably, the sulfur-containing hydrocarbon comprises a hydrocarbon fluid selected from the group consisting of gasoline, cracked-gasoline, diesel fuel, and mixtures thereof.

As used herein, the term "gasoline" denotes a mixture of hydrocarbons boiling in a range of from about 100° F. to about 400° F., or any fraction thereof. Examples of suitable gasolines include, but are not limited to, hydrocarbon streams in refineries such as naphtha, straight-run naphtha, coker naphtha, catalytic gasoline, visbreaker naphtha, alkylates, isomerate, reformate, and the like, and mixtures thereof.

As used herein, the term "cracked-gasoline" denotes a mixture of hydrocarbons boiling in a range of from about 100° F. to about 400° F., or any fraction thereof, that are products of either thermal or catalytic processes that crack larger hydrocarbon molecules into smaller molecules. Examples of suitable thermal processes include, but are not limited to, coking, thermal cracking, visbreaking, and the like, and combinations thereof. Examples of suitable catalytic cracking processes include, but are not limited to, fluid catalytic cracking, heavy oil cracking, and the like, and combinations thereof. Thus, examples of suitable cracked-gasolines include, but are not limited to, coker gasoline, thermally cracked gasoline, visbreaker gasoline, fluid catalytically cracked gasoline, heavy oil cracked-gasoline and the like, and combinations thereof. In some instances, the cracked-gasoline may be fractionated and/or hydrotreated prior to desulfurization when used as the sulfur-containing fluid in the process in the present invention.

As used herein, the term "diesel fuel" denotes a mixture of hydrocarbons boiling in a range of from about 300° F. to about 750° F., or any fraction thereof. Examples of suitable diesel fuels include, but are not limited to, light cycle oil, kerosene, jet fuel, straight-run diesel, hydrotreated diesel, and the like, and combinations thereof.

The sulfur-containing hydrocarbon described herein as suitable feed in the inventive desulfurization process comprises a quantity of olefins, aromatics, and sulfur, as well as paraffins and naphthenes. The amount of olefins in gaseous cracked-gasoline is generally in a range of from about 10 to about 35 weight percent olefins based on the total weight of the gaseous cracked-gasoline. For diesel fuel there is essentially no olefin content. The amount of aromatics in gaseous cracked-gasoline is generally in a range of from about 20 to about 40 weight percent aromatics based on the total weight of the gaseous cracked-gasoline. The amount of aromatics in gaseous diesel fuel is generally in a range of from about 10 to about 90 weight percent aromatics based on the total weight of the gaseous diesel fuel. The amount of atomic sulfur in the sulfur-containing hydrocarbon fluid, preferably cracked-gasoline or diesel fuel, suitable for use in the inventive desulfurization process is generally greater than about 50 parts per million by weight (ppmw) of the sulfur-containing hydrocarbon fluid, more preferably in a range of from about 100 ppmw atomic sulfur to about 10,000 ppmw atomic sulfur, and most preferably from 150 ppmw atomic sulfur to 500 ppmw atomic sulfur. It is preferred for at least about 50 weight percent of the atomic sulfur present in the sulfur-containing hydrocarbon fluid employed in the present invention to be in the form of organosulfur compounds. More preferably, at least about 75 weight percent of the atomic sulfur present in the sulfur-containing hydrocarbon fluid is in the form of organosulfur compounds, and most preferably at least 90 weight percent of the atomic sulfur is in the form of organosulfur compounds. As used herein, "sulfur" used in conjunction with "ppmw sulfur" or the term "atomic sulfur", denotes the amount of atomic sulfur (about 32 atomic mass units) in the sulfur-containing hydrocarbon, not the atomic mass, or weight, of a sulfur compound, such as an organosulfur compound.

As used herein, the term "sulfur" denotes sulfur in any form normally present in a sulfur-containing hydrocarbon such as cracked-gasoline or diesel fuel. Examples of such sulfur which can be removed from a sulfur-containing hydrocarbon fluid through the practice of the present invention include, but are not limited to, hydrogen sulfide, carbonyl sulfide (COS), carbon disulfide ($CS_2$), mercaptans (RSH), organic sulfides (R—S—R), organic disulfides (R—S—S—R), thiophene, substitute thiophenes, organic trisulfides, organic tetrasulfides, benzothiophene, alkyl thiophenes, alkyl benzothiophenes, alkyl dibenzothiophenes, and the like, and combinations thereof, as well as heavier molecular weights of the same which are normally present in sulfur-containing hydrocarbons of the types contemplated for use in the desulfurization process of the present invention, wherein each R can by an alkyl, cycloalkyl, or aryl group containing one to 10 carbon atoms.

As used herein, the term "fluid" denotes gas, liquid, vapor, and combinations thereof.

As used herein, the term "gaseous" denotes the state in which the sulfur-containing hydrocarbon fluid, such as cracked-gasoline or diesel fuel, is primarily in a gas or vapor phase.

In fluidized bed reactor 12, the reduced sorbent particulates are contacted with the upwardly flowing gaseous hydrocarbon-containing fluid stream under a set of desulfurization conditions sufficient to produce a desulfurized hydrocarbon and sulfur-loaded sorbent particulates. The flow of the hydrocarbon-containing fluid stream is sufficient to fluidize the bed of sorbent particulates located in reactor 12. The desulfurization conditions in reactor 12 include temperature, pressure, weighted hourly space velocity (WHSV), and superficial velocity. The preferred ranges for such desulfurization conditions are provided below in Table 3.

TABLE 3

Desulfurization Conditions

| Range | Temp (° F.) | Press. (psig) | WHSV ($hr^{-1}$) | Superficial Vel. (ft/s) |
|---|---|---|---|---|
| Preferred | 250–1200 | 25–750 | 1–20 | 0.25–5 |
| More Preferred | 500–1000 | 100–400 | 2–12 | 0.5–2.5 |
| Most Preferred | 700–850 | 150–250 | 3–8 | 1.0–1.5 |

When the reduced sorbent particulates are contacted with the hydrocarbon-containing stream in reactor 12 under desulfurization conditions, sulfur compounds, particularly organosulfur compounds, present in the hydrocarbon-containing fluid stream are removed from such fluid stream. At least a portion of the sulfur removed from the hydrocarbon-containing fluid stream is employed to convert at least a portion of the zinc oxide of the reduced solid sorbent particulates into zinc sulfide.

In contrast to many conventional sulfur removal processes (e.g., hydrodesulfurization), it is preferred that substantially none of the sulfur in the sulfur-containing hydrocarbon fluid is converted to, and remains as, hydrogen sulfide during desulfurization in reactor 12. Rather, it is preferred that the fluid effluent from reactor 12 (generally comprising the desulfurized hydrocarbon and hydrogen) comprises less than the amount of hydrogen sulfide, if any, in the fluid feed charged to reactor 12 (generally comprising the sulfur-containing hydrocarbon and hydrogen). The fluid effluent from reactor 12 preferably contains less than about 50 weight percent of the amount of sulfur in the fluid feed charged to reactor 12, more preferably less than about 20 weight percent of the amount of sulfur in the fluid feed, and most preferably less than five weight percent of the amount of sulfur in the fluid feed. It is preferred for the total sulfur content of the fluid effluent from reactor 12 to be less than about 50 parts per million by weight (ppmw) of the total fluid effluent, more preferably less than about 30 ppmw, still more preferably less than about 15 ppmw, and most preferably less than 10 ppmw.

After desulfurization in reactor 12, the desulfurized hydrocarbon fluid, preferably desulfurized cracked-gasoline or desulfurized diesel fuel, can thereafter be separated and recovered from the fluid effluent and preferably liquified. The liquification of such desulfurized hydrocarbon fluid can be accomplished by any method or manner known in the art. The resulting liquified, desulfurized hydrocarbon preferably comprises less than about 50 weight percent of the amount of sulfur in the sulfur-containing hydrocarbon (e.g., cracked-gasoline or diesel fuel) charged to the reaction zone, more preferably less than about 20 weight percent of the amount of sulfur in the sulfur-containing hydrocarbon, and most preferably less than five weight percent of the amount of sulfur in the sulfur-containing hydrocarbon. The desulfurized hydrocarbon preferably comprises less than about 50 ppmw sulfur, more preferably less than about 30 ppmw sulfur, still more preferably less than about 15 ppmw sulfur, and most preferably less than 10 ppmw sulfur.

After desulfurization in reactor 12, at least a portion of the sulfur-loaded sorbent particulates are transported to regenerator 14 via a first transport assembly 18. In regenerator 14, the sulfur-loaded solid sorbent particulates are contacted with an oxygen-containing regeneration stream. The oxygen-containing regeneration stream preferably comprises at least one mole percent oxygen with the remainder being a gaseous diluent. More preferably, the oxygen-containing regeneration stream comprises in the range of from about one to about 50 mole percent oxygen and in the range of from about 50 to about 95 mole percent nitrogen, still more preferable in the range of from about two to about 20 mole percent oxygen and in the range of from about 70 to about 90 mole percent nitrogen, and most preferably in the range of from three to 10 mole percent oxygen and in the range of from 75 to 85 mole percent nitrogen.

The regeneration conditions in regenerator 14 are sufficient to convert at least a portion of the zinc sulfide of the sulfur-loaded sorbent particulates into zinc oxide via contacting with the oxygen-containing regeneration stream. The preferred ranges for such regeneration conditions are provided below in Table 4.

TABLE 4

| | Regeneration Conditions | | |
|---|---|---|---|
| Range | Temp (° F.) | Press. (psig) | Superficial Vel. (ft/s) |
| Preferred | 500–1500 | 10–250 | 0.5–10 |
| More Preferred | 700–1200 | 20–150 | 1.0–5.0 |
| Most Preferred | 900–1100 | 30–75 | 2.0–2.5 |

When the sulfur-loaded sorbent particulates are contacted with the oxygen-containing regeneration stream under the regeneration conditions described above, at least a portion of the promoter metal component is oxidized to form the oxidized promoter metal component. Preferably, in regenerator 14 the substitutional solid metal solution ($M_A Zn_B$) and/or sulfided substitutional solid metal solution ($M_A Zn_B S$) of the sulfur-loaded sorbent is converted to the substitutional solid metal oxide solution ($M_X Zn_Y O$).

The regenerated sorbent particulates exiting regenerator 14 preferably comprise zinc oxide, the oxidized promoter metal component ($M_X Zn_Y O$), perlite, and the promoter metal-zinc aluminate ($M_Z Zn_{(1-Z)} Al_2 O_4$) in the ranges provided below in Table 5.

TABLE 5

| | Components of the Regenerated Sorbent Particulates | | | |
|---|---|---|---|---|
| Range | ZnO (wt %) | $M_X Zn_Y O$ (wt %) | Perlite (wt %) | $M_Z Zn_{(1-Z)} Al_2 O_4$ (wt %) |
| Preferred | 5–80 | 5–70 | 5–50 | 1–50 |
| More Preferred | 20–60 | 15–60 | 10–40 | 5–30 |
| Most Preferred | 30–50 | 20–40 | 20–30 | 10–20 |

After regeneration in regenerator 14, the regenerated (i.e., oxidized) sorbent particulates are transported to reducer 16 via a second transport assembly 20. In reducer 16, the regenerated sorbent particulates are contacted with a hydrogen-containing reducing stream. The hydrogen-containing reducing stream preferably comprises at least about 50 mole percent hydrogen with the remainder being cracked hydrocarbon products such as, for example, methane, ethane, and propane. More preferably, the hydrogen-containing reducing stream comprises about 70 mole percent hydrogen, and most preferably at least 80 mole percent hydrogen. The reducing conditions in reducer 16 are sufficient to reduce the valence of the oxidized promoter metal component of the regenerated sorbent particulates. The preferred ranges for such reducing conditions are provided below in Table 6.

TABLE 6

| | Reducing Conditions | | |
|---|---|---|---|
| Range | Temp (° F.) | Press. (psig) | Superficial Vel. (ft/s) |
| Preferred | 250–1250 | 25–750 | 0.1–4.0 |
| More Preferred | 600–1000 | 100–400 | 0.2–2.0 |
| Most Preferred | 750–850 | 150–250 | 0.3–1.0 |

When the regenerated sorbent particulates are contacted with the hydrogen-containing reducing stream in reducer 16 under the reducing conditions described above, at least a portion of the oxidized promoter metal component is reduced to form the reduced-valence promoter metal component of the reduced sorbent particulates. Preferably, at least a substantial portion of the substitutional solid metal oxide solution ($M_X Zn_Y O$) is converted to the reduced-valence promoter metal component ($M_A Zn_B$).

The reduced sorbent particulates preferably comprise zinc oxide, the reduced-valence promoter metal component ($M_A Zn_B$), perlite, and the promoter metal-zinc aluminate substitutional solid ($M_Z Zn_{(1-Z)} Al_2 O_4$) in the ranges provided below in Table 7.

TABLE 7

| | Components of the Reduced Sorbent Particulates | | | |
|---|---|---|---|---|
| Range | ZnO (wt %) | $M_A Zn_B$ (wt %) | Perlite (wt %) | $M_Z Zn_{(1-Z)} Al_2 O_4$ (wt %) |
| Preferred | 5–80 | 5–80 | 2–50 | 1–50 |
| More Preferred | 20–60 | 20–60 | 5–30 | 5–30 |
| Most Preferred | 30–50 | 30–40 | 10–20 | 10–20 |

After the sorbent particulates have been reduced in reducer 16, they can be transported back to reactor 12 via a third transport assembly 22 for recontacting with the hydrocarbon-containing fluid stream in reactor 12.

Referring again to FIG. 1, first transport assembly 18 generally comprises a reactor pneumatic lift 24, a reactor receiver 26, and a reactor lockhopper 28 fluidly disposed between reactor 12 and regenerator 14. During operation of desulfurization unit 10 the sulfur-loaded sorbent particulates are continuously withdrawn from reactor 12 and lifted by reactor pneumatic lift 24 from reactor 12 to reactor receiver 18. Reactor receiver 18 is fluidly coupled to reactor 12 via a reactor return line 30. The lift gas used to transport the sulfur-loaded sorbent particulates from reactor 12 to reactor receiver 26 is separated from the sulfur-loaded sorbent particulates in reactor receiver 26 and returned to reactor 12 via reactor return line 30. Reactor lockhopper 26 is operable to transition the sulfur-loaded sorbent particulates from the high pressure hydrocarbon environment of reactor 12 and reactor receiver 26 to the low pressure oxygen environment of regenerator 14. To accomplish this transition, reactor lockhopper 28 periodically receives batches of the sulfur-loaded sorbent particulates from reactor receiver 26, isolates the sulfur-loaded sorbent particulates from reactor receiver 26 and regenerator 14, and changes the pressure and composition of the environment surrounding the sulfur-loaded sorbent particulates from a high pressure hydrocarbon environment to a low pressure inert (e.g., nitrogen) environment. After the environment of the sulfur-loaded sorbent particulates has been transitioned, as described above, the sulfur-loaded sorbent particulates are batch-wise transported from reactor lockhopper 28 to regenerator 14. Because the sulfur-loaded solid particulates are continuously withdrawn from reactor 12 but processed in a batch mode in reactor lockhopper 28, reactor receiver 26 functions as a surge vessel wherein the sulfur-loaded sorbent particulates continuously withdrawn from reactor 12 can be accumulated between transfers of the sulfur-loaded sorbent particulates from reactor receiver 26 to reactor lockhopper 28. Thus, reactor receiver 26 and reactor lockhopper 28 cooperate to transition the flow of the sulfur-loaded sorbent particulates between reactor 12 and regenerator 14 from a continuous mode to a batch mode.

Second transport assembly 20 generally comprises a regenerator pneumatic lift 32, a regenerator receiver 34, and a regenerator lockhopper 36 fluidly disposed between regenerator 14 and reducer 16. During operation of desulfurization unit 10 the regenerated sorbent particulates are continuously withdrawn from regenerator 14 and lifted by regenerator pneumatic lift 32 from regenerator 14 to regenerator receiver 34. Regenerator receiver 34 is fluidly coupled to regenerator 14 via a regenerator return line 38. The lift gas used to transport the regenerated sorbent particulates from regenerator 14 to regenerator receiver 34 is separated from the regenerated sorbent particulates in regenerator receiver 34 and returned to regenerator 14 via regenerator return line 38. Regenerator lockhopper 36 is operable to transition the regenerated sorbent particulates from the low pressure oxygen environment of regenerator 14 and regenerator receiver 34 to the high pressure hydrogen environment of reducer 16. To accomplish this transition, regenerator lockhopper 36 periodically receives batches of the regenerated sorbent particulates from regenerator receiver 34, isolates the regenerated sorbent particulates from regenerator receiver 34 and reducer 16, and changes the pressure and composition of the environment surrounding the regenerated sorbent particulates from a low pressure oxygen environment to a high pressure hydrogen environment. After the environment of the regenerated sorbent particulates has been transitioned, as described above, the regenerated sorbent particulates are batch-wise transported from regenerator lockhopper 36 to reducer 16. Because the regenerated sorbent particulates are continuously withdrawn from regenerator 14 but processed in a batch mode in regenerator lockhopper 36, regenerator receiver 34 functions as a surge vessel wherein the sorbent particulates continuously withdrawn from regenerator 14 can be accumulated between transfers of the regenerated sorbent particulates from regenerator receiver 34 to regenerator lockhopper 36. Thus, regenerator receiver 34 and regenerator lockhopper 36 cooperate to transition the flow of the regenerated sorbent particulates between regenerator 14 and reducer 16 from a continuous mode to a batch mode.

The following examples are presented to further illustrate this invention and are not to be construed as unduly limiting the scope of this invention.

EXAMPLE I

This example describes the procedure used to prepare six sorbent compositions (i.e., Sorbents A–F). Sorbents A, C, and E employed untreated perlite, while Sorbents B, D, and F employed acid-treated perlite.

Sorbent A was prepared by mixing 974.0 grams of distilled water and 166.7 grams of aluminum hydroxide powder (Dispal® Alumina Powder, available from CONDEA Vista Company, Houston, Tex.) to create a wet mix. In a separate container, a 452.0 gram quantity of zinc oxide powder (available from Zinc Corporation, Monaca, Pa.) and a 171.3 gram quantity of expanded perlite (Harborlite™ 205, available from Harborlite Corporation, Antonito, Colo.) were combined to create a dry mix. The wet mix and dry mix were then combined and mixed to form a sorbent base slurry.

The sorbent base slurry was formed into sorbent particulates using a counter-current spray drier (Niro Atomizer Model 68, available from Niro Atomizer, Inc., Columbia, Md.). The sorbent base slurry was charged to the spray drier wherein it was contacted in a particulating chamber with air flowing through the chamber. The resulting spray-dried sorbent base particulates were then sieved to remove particles larger than 100 mesh and smaller than 635 mesh. The sieved sorbent base particulates were then placed in an oven and dried by ramping the oven temperature at 3° C./min to 150° C. and holding at 150° C. for 1 hour. The dried sorbent base particulates were then calcined by ramping the oven temperature at 5° C./min to 635° C. and holding at 635° C. for 1 hour.

A 150.0 gram quantity of the calcined sorbent base particulates were then impregnated with a solution containing 149.3 grams of nickel nitrate hexahydrate and 24.3 grams of distilled water using incipient wetness techniques. The impregnated sorbent was then put in an oven and dried by ramping the oven temperature at 3° C./min to 150° C. and holding at 150° C. for 1 hour. The dried sorbent was then calcined by ramping the oven temperature at 5° C./min to 635° C. and holding at 635° C. for 1 hour. The resulting nickel-promoted sorbent, formed of 16% nickel, 17.7% alumina, 48.1% zinc oxide, and 18.2% untreated perlite by weight, was designated Sorbent A.

Sorbent B was prepared by mixing 1274.0 grams of distilled water and 166.7 grams of aluminum hydroxide powder (Dispal® Alumina Powder, available from CONDEA Vista Company, Houston, Tex.) to create a wet mix. In a separate container, a 452.0 gram quantity of zinc oxide powder (available from Zinc Corporation, Monaca, Pa.) and a 171.3 gram quantity of acid-treated expanded perlite (Harborlite™ 205, available from Harborlite Corporation, Antonito, Colo.) were combined to create a dry mix. The acid-treated expanded perlite had been pretreated by soaking in distilled water for 1 hour, followed by rinsing four times with one liter of distilled water, and finally rinsing one time with one liter of 5% nitric acid. The wet mix and dry mix were then combined and mixed to form a sorbent base slurry.

The sorbent base slurry was formed into sorbent particulates using a counter-current spray drier (Niro Atomizer Model 68, available from Niro Atomizer, Inc., Columbia, Md.). The sorbent base slurry was charged to the spray drier wherein it was contacted in a particulating chamber with air flowing through the chamber. The resulting spray-dried sorbent base particulates were then sieved to remove particles larger than 100 mesh and smaller than 635 mesh. The sieved sorbent base particulates were then placed in an oven and dried by ramping the oven temperature at 3° C./min to 150° C. and holding at 150° C. for 1 hour. The dried sorbent base particulates were then calcined by ramping the oven temperature at 5° C./min to 635° C. and holding at 635° C. for 1 hour.

A 106.8 gram quantity of the calcined sorbent base particulates were then impregnated with a solution containing 106.3 grams of nickel nitrate hexahydrate and 10.0 grams of distilled water using incipient wetness techniques. The impregnated sorbent was then put in an oven and dried by ramping the oven temperature at 3° C./min to 150° C. and holding at 150° C. for 1 hour. The dried sorbent was then calcined by ramping the oven temperature at 5° C./min to 635° C. and holding at 635° C. for 1 hour. The resulting nickel-promoted sorbent, formed of 16% nickel, 17.7% alumina, 48.1% zinc oxide, and 18.2% acid-treated perlite by weight, was designated Sorbent B.

Sorbent C was prepared by mixing 483.0 grams of deionized water and 72.86 grams of aluminum hydroxide powder (Dispal® Alumina Powder, available from CONDEA Vista Company, Houston, Tex.) to create a wet mix. In a separate container, a 274.75 gram quantity of zinc oxide powder (available from Zinc Corporation, Monaca, Pa.) and a 87.39 gram quantity of expanded perlite (Harborlite™ 205, available from Harborlite Corporation, Antonito, Colo.) were combined to create a dry mix. The wet mix and dry mix were then combined and mixed to form a sorbent base slurry.

The sorbent base slurry was formed into sorbent particulates using a counter-current spray drier (Niro Atomizer Model 68, available from Niro Atomizer, Inc., Columbia, Md.). The sorbent base slurry was charged to the spray drier wherein it was contacted in a particulating chamber with air flowing through the chamber. The resulting spray-dried sorbent base particulates were then sieved to remove particles larger than 100 mesh and smaller than 635 mesh. The sieved sorbent base particulates were then placed in an oven and dried by ramping the oven temperature at 3° C./min to 150° C. and holding at 150° C. for 1 hour. The dried sorbent base particulates were then calcined by ramping the oven temperature at 5° C./min to 635° C. and holding at 635° C. for 1 hour.

A 63.0 gram quantity of the calcined sorbent base particulates were then impregnated with a solution containing 62.7 grams of nickel nitrate hexahydrate and 5.9 grams of distilled water using incipient wetness techniques. The impregnated sorbent was then put in an oven and dried by ramping the oven temperature at 3° C./min to 150° C. and holding at 150° C. for 1 hour. The dried sorbent was then calcined by ramping the oven temperature at 5° C./min to 635° C. and holding at 635° C. for 1 hour. The resulting nickel-promoted sorbent, formed of 16% nickel, 14.1% alumina, 53.0% zinc oxide, and 16.9% untreated perlite by weight, was designated Sorbent C.

Sorbent D was prepared by mixing 533.0 grams of deionized water and 72.86 grams of aluminum hydroxide powder (Dispal® Alumina Powder, available from CONDEA Vista Company, Houston, Tex.) to create a wet mix. In a separate container, a 274.75 gram quantity of zinc oxide powder (available from Zinc Corporation, Monaca, Pa.) and a 87.39 gram quantity of acid-treated expanded perlite (Harborlite™ 205, available from Harborlite Corporation, Antonito, Colo.) were combined to create a dry mix. The acid-treated expanded perlite had been pretreated by soaking in distilled water for 1 hour, followed by rinsing four times with one liter of distilled water, and finally rinsing one time with one liter of 5% nitric acid. The wet mix and dry mix were then combined and mixed to form a sorbent base slurry.

The sorbent base slurry was formed into sorbent particulates using a counter-current spray drier (Niro Atomizer Model 68, available from Niro Atomizer, Inc., Columbia, Md.). The sorbent base slurry was charged to the spray drier wherein it was contacted in a particulating chamber with air flowing through the chamber. The resulting spray-dried sorbent base particulates were then sieved to remove particles larger than 100 mesh and smaller than 635 mesh. The sieved sorbent base particulates were then placed in an oven and dried by ramping the oven temperature at 3° C./min to 150° C. and holding at 150° C. for 1 hour. The dried sorbent base particulates were then calcined by ramping the oven temperature at 5° C./min to 635° C. and holding at 635° C. for 1 hour.

A 100.5 gram quantity of the calcined sorbent base particulates were then impregnated with a solution containing 100.5 grams of nickel nitrate hexahydrate and 9.5 grams of distilled water using incipient wetness techniques. The impregnated sorbent was then put in an oven and dried by ramping the oven temperature at 3° C./min to 150° C. and holding at 150° C. for 1 hour. The dried sorbent was then calcined by ramping the oven temperature at 5° C./min to 635° C. and holding at 635° C. for 1 hour. The resulting nickel-promoted sorbent, formed of 16% nickel, 14.1% alumina, 53.0% zinc oxide, and 16.9% acid-treated perlite by weight, was designated Sorbent D.

Sorbent E was prepared by mixing 1271.0 grams of distilled water and 146.0 grams of aluminum hydroxide powder (Dispal® Alumina Powder, available from CONDEA Vista Company, Houston, Tex.) to create a wet mix. In a separate container, a 575.0 gram quantity of zinc oxide powder (available from Zinc Corporation, Monaca, Pa.) and a 186.9 gram quantity of expanded perlite (Harborlite™ 205, available from Harborlite Corporation, Antonito, Colo.) were combined to create a dry mix. The perlite had been soaked in sodium hydroxide overnight. The wet mix and dry mix were then combined and mixed to form a sorbent base slurry.

The sorbent base slurry was formed into sorbent particulates using a counter-current spray drier (Niro Atomizer Model 68, available from Niro Atomizer, Inc., Columbia, Md.). The sorbent base slurry was charged to the spray drier wherein it was contacted in a particulating chamber with air flowing through the chamber. The resulting spray-dried sorbent base particulates were then sieved to remove particles larger than 100 mesh and smaller than 635 mesh. The sieved sorbent base particulates were then placed in an oven and dried by ramping the oven temperature at 3° C./min to 150° C. and holding at 150° C. for 1 hour. The dried sorbent base particulates were then calcined by ramping the oven temperature at 5° C./min to 635° C. and holding at 635° C. for 1 hour.

A 130.0 gram quantity of the calcined sorbent base particulates were then impregnated with a solution containing 127.3 grams of nickel nitrate hexahydrate and 12.0 grams of distilled water using incipient wetness techniques. The impregnated sorbent was then put in an oven and dried by ramping the oven temperature at 3° C./min to 150° C. and holding at 150° C. for 1 hour. The dried sorbent was then calcined by ramping the oven temperature at 5° C./min to 635° C. and holding at 635° C. for 1 hour. The resulting nickel-promoted sorbent, formed of 16.5% nickel, 13.4% alumina, 52.9% zinc oxide, and 17.2% untreated perlite by weight, was designated Sorbent E.

Sorbent F was prepared by mixing 533.0 grams of deionized water and 72.86 grams of aluminum hydroxide powder (Dispal® Alumina Powder, available from CONDEA Vista Company, Houston, Tex.) to create a wet mix. In a separate container, a 269.13 gram quantity of zinc oxide powder (available from Zinc Corporation, Monaca, Pa.) and a 93.0 gram quantity of acid-treated expanded perlite (Harborlite™ 205, available from Harborlite Corporation, Antonito, Colo.) were combined to create a dry mix. The acid-treated expanded perlite had been pretreated by soaking in distilled water for 1 hour, followed by rinsing four times with one liter of distilled water, and finally rinsing one time with one liter of 5% nitric acid. The wet mix and dry mix were then combined and mixed to form a sorbent base slurry.

The sorbent base slurry was formed into sorbent particulates using a counter-current spray drier (Niro Atomizer Model 68, available from Niro Atomizer, Inc., Columbia, Md.). The sorbent base slurry was charged to the spray drier wherein it was contacted in a particulating chamber with air flowing through the chamber. The resulting spray-dried sorbent base particulates were then sieved to remove particles larger than 100 mesh and smaller than 635 mesh. The sieved sorbent base particulates were then placed in an oven and dried by ramping the oven temperature at 3° C./min to 150° C. and holding at 150° C. for 1 hour. The dried sorbent base particulates were then calcined by ramping the oven temperature at 5° C./min to 635° C. and holding at 635° C. for 1 hour.

A 105.0 gram quantity of the calcined sorbent base particulates were then impregnated with a solution containing 108.4 grams of nickel nitrate hexahydrate and 10.3 grams of distilled water using incipient wetness techniques. The impregnated sorbent was then put in an oven and dried by ramping the oven temperature at 3° C./min to 150° C. and holding at 150° C. for 1 hour. The dried sorbent was then calcined by ramping the oven temperature at 5° C./min to 635° C. and holding at 635° C. for 1 hour. The resulting nickel-promoted sorbent, formed of 16% nickel, 14.0% alumina, 52.0% zinc oxide, and 18.0% acid-treated perlite by weight, was designated Sorbent F.

EXAMPLE 2

In this example, the attrition resistance of Sorbents A–F were tested. A "Fresh" Jet Cup Attrition Index was determined for the freshly prepared Sorbents A–F and an Operational Jet Cup Attrition Index was determined for Sorbents E and F. Determination of the Jet Cup Attrition Index is described earlier in this application.

The Operational Jet Cup Attrition Index of the sorbent was the Jet Cup Attrition Index of the sorbent, measured after a certain repeated reduction/oxidation (redox) procedure, described in detail below. The repeated redox procedure was designed to simulate the conditions which the sorbent would be exposed to in an actual desulfurization. FIG. 2 shows the redox test system 100 used to "age" Sorbents E and F so that an Operational Jet Cup Attrition Index could be measured. Redox test system 100 included a hydrogen source 102, an air source 104, a nitrogen source 106, and a reactor tube 108. Three mass flow controllers 110, 112, 114 controlled the flow rate of hydrogen, air, and nitrogen, respectively, through reactor tube 108. The hydrogen and air passed through a manual three-way valve 116, which prevented both hydrogen and air from flowing to reactor tube 108 at the same time. Reactor tube 108 was a 26-inch quartz reactor tube containing a three-inch upper section with a 0.5-inch outer diameter (O.D.), a 20-inch reactor section (one-inch O.D.) with a glass frit 117 centered in the reactor section, and a three-inch lower section 0.5-inch O.D.). Reactor tube 108 was positioned in a 15-inch long clam shell furnace 118. A thermocouple 120 was disposed at the upper end of reactor tube 108 and extended down into reactor tube 108, three inches above the glass frit 117. Thermocouple 120 was connected to a temperature readout and was not temperature controlling. Two temperature controlling thermocouples 122, 124 were connected through the side of two-zone clam shell furnace 118. A side port 126 at the top of reactor tube 108 was fluidly coupled to a vent line 128. An inlet port 130 of reactor tube 108 is fluidly coupled to hydrogen, air, and nitrogen sources 102, 104, 106 via a supply line 132.

To perform the repeated redox procedure in redox test system 100, the sorbent particulates were first screened to remove particles smaller than 325 mesh and larger than 100 mesh. A 10 gram quantity of the screen sorbent particulates was then loaded on the top of the glass frit 117 through the top of reactor tube 108. Nitrogen was then turned on at 200 standard cubic centimeters per minute (SCCM) and reactor tube 108 was purged with nitrogen for 15 minutes. Reactor tube 108 was then heated to 800° F. in flowing nitrogen for 15 minutes. The nitrogen flow was then stopped and the hydrogen flow rate was set to 300 SCCM. The sorbent was allowed to reduce in flowing hydrogen for one hour. The hydrogen flow was then stopped, and nitrogen was set to flow at 200 SCCM for 15 minutes while reactor tube 108 was heated to 950° F. The nitrogen flow was then stopped and air was turned on to 100 SCCM and the sorbent was allowed to oxidize for one hour. The air was then shut off and nitrogen was allowed to purge reactor tube 108 for 15 minutes at 200 SCCM. The above purge, reduction, purge, oxidation, and purge steps were then repeated two more times for a total of three redox cycles. After the three redox cycles, the nitrogen was stopped and the hydrogen flow rate was set to 300 SCCM and the sorbent was allowed to reduce for one hour. The hydrogen flow was then stopped and nitrogen set to a flow at 200 SCCM for 15 minutes. The nitrogen flow was then stopped and reactor tube 108 was allowed to cool to ambient temperature. The sorbent, having been subjected to 3.5 redox cycles, was then removed from reactor tube 108 and the Jet Cup Attrition Index of this sorbent was determined in the manner described above. The resulting Jet Cup Attrition Index of the "aged" sorbent subjected to 3.5 redox cycles was its Operational Jet Cup Attrition Index.

The "Fresh" Jet Cup Attrition Index (DI) of Sorbents A–F and the Operational Jet Cup Attrition Index of Sorbents E and F, determined in accordance with the above procedures, are provided below in Table 8.

TABLE 8

| | Ingredients (wt. %) | | | | | Attrition Resistance | | |
| --- | --- | --- | --- | --- | --- | --- | --- | --- |
| | | | | | | | % | |
| Sorbent | Alumina | Zinc Oxide | Perlite | Nickel | Acid Treated | Fresh DI | Oper DI | Δ DI |
| A | 17.7 | 48.1 | 18.2 | 16.0 | No | 16.9 | — | — |
| B | 17.7 | 48.1 | 18.2 | 16.0 | Yes | 10.4 | — | — |
| C | 14.1 | 53.0 | 16.9 | 16.0 | No | 15.7 | — | — |
| D | 14.1 | 53.0 | 16.9 | 16.0 | Yes | 10.1 | — | — |
| E | 13.4 | 52.9 | 17.2 | 16.5 | No | 10.0 | 15.8 | 58.0 |
| F | 14.0 | 52.0 | 18.0 | 16.0 | Yes | 10.8 | 11.4 | 5.6 |

Table 8 shows that the Jet Cup Attrition Index of freshly prepared sorbents employing acid-treated perlite is lower than the Jet Cup Attrition Index of freshly prepared sorbents employing untreated perlite. Such lower Jet Cup Attrition Index for sorbents employing acid-treated perlite indicates enhanced attrition resistance of these sorbents. Further, Table 8 shows that the difference between the Fresh Jet Cup Attrition Index and the Operational Jet Cup Attrition Index of sorbents employing acid-treated perlite is much less than the difference between the Fresh Jet Cup Attrition Index and the Operational Jet Cup Attrition Index of sorbents employing untreated perlite. Thus, sorbents employing acid-treated perlite tend to resist attrition and resist softening better than sorbents employing untreated perlite, especially after multiple cycles of reduction and oxidation.

EXAMPLE 3

This example describes the making of a nickel-promoted Sorbent G, wherein nickel is incorporated into the sorbent without requiring a nickel impregnation step. Rather than being incorporated by impregnation, the nickel is pre-reacted with zinc to create a nickel-zinc substitutional solid solution which is then mixed with the other components of the sorbent.

A nickel-zinc substitutional solid solution was prepared by mixing 866.18 grams of nickel II acetate tetrahydrate and 299.62 grams of zinc acetate dihydrate in a beaker with a small amount of deionized water and added heat. The nickel-zinc mixture was then transferred to a quartz dish and calcined on a belt calciner for 1.5 hours at 635° C. The resulting calcined nickel-zinc mixture was placed in a ball mill and subjected to particle size reduction in the ball mill for 5 minutes.

A 1022.0 gram quantity of distilled water and 146.0 grams of aluminum hydroxide powder (Dispal® Alumina Powder, available from CONDEA Vista Company, Houston, Tex.) were mixed to create a wet mix. In a separate container, a 835.0 gram quantity of the milled nickel-zinc mixture and a 150.0 gram quantity of expanded perlite (Harborlite™ 205, available from Harborlite Corporation, Antonito, Colo.) were combined to create a dry mix. The wet mix and dry mix were then combined and mixed to form a sorbent slurry. A 55.0 gram quantity of 5% nitric acid was added to the sorbent slurry to bring the pH of the slurry to 6.0.

The sorbent slurry was formed into sorbent particulates using a counter-current spray drier (Niro Atomizer Model 68, available from Niro Atomizer, Inc., Columbia, Md.). The sorbent slurry was charged to the spray drier wherein it was contacted in a particulating chamber with air flowing through the chamber. The resulting spray-dried sorbent particulates were then sieved to remove particles larger than 100 mesh and smaller than 635 mesh. The sieved sorbent base particulates were then placed in an oven and dried by ramping the oven temperature at 3° C./min to 150° C. and holding at 150° C. for 1 hour. The dried sorbent particulates were then calcined by ramping the oven temperature at 5° C./min to 635° C. and holding at 635° C. for 1 hour. The resulting nickel-promoted sorbent was designated Sorbent G. The Jet Cup Attrition Index of Sorbent G was 16.7.

EXAMPLE 4

This example describes the making of a nickel-promoted Sorbent H, wherein nickel is incorporated into the sorbent without requiring a nickel impregnation step. Rather than being incorporated by impregnation, the nickel is dissolved in the distilled water used to create a spray-dryable slurry of the sorbent components.

Sorbent H was prepared by mixing 608.0 grams of distilled water and 695.0 grams of nickel nitrate hexahydrate to form a nickel solution. A 146.0 gram quantity of aluminum hydroxide powder (Disperal® Alumina Powder, available from CONDEA Vista Company, Houston, Tex.) was added to the nickel solution to create a wet mix. In a separate container, a 575.0 gram quantity of zinc oxide powder (available from Zinc Corporation, Monaca, Pa.) and a 150 gram quantity of expanded perlite (Sil-Kleer™ 27M, available from Silbrico Corporation, Hodgkins, Ill.) were combined to create a dry mix. The wet mix and dry mix were then combined and mixed to form a sorbent slurry.

The sorbent slurry was formed into sorbent particulates using a counter-current spray drier (Niro Atomizer Model 68, available from Niro Atomizer, Inc., Columbia, Md.). The sorbent slurry was charged to the spray drier wherein it was contacted in a particulating chamber with air flowing through the chamber. The resulting spray-dried sorbent particulates were then sieved to remove particles larger than 100 mesh and smaller than 635 mesh. The sieved sorbent particulates were then placed in an oven and dried by ramping the oven temperature at 3° C./min to 150° C. and holding at 150° C. for 1 hour. The dried sorbent particulates were then calcined by ramping the oven temperature at 5° C./min to 635° C. and holding at 635° C. for 1 hour. The resulting nickel-promoted sorbent was designated Sorbent H. The Jet Cup Attrition Index of Sorbent H was 5.5.

EXAMPLE 5

This example describes the making of a nickel-promoted Sorbent I, wherein nickel is incorporated into the sorbent without requiring a nickel impregnation step. Rather than being incorporated by impregnation, the nickel is incorporated as nickel oxide in the dry mix used to create a slurry of the sorbent components.

Sorbent I was prepared by mixing 1218.0 grams of distilled water and 155.3 grams of aluminum hydroxide powder (Dispal® Alumina Powder, available from CONDEA Vista Company, Houston, Tex.) to create a wet mix. In a separate container, a 574.2 gram quantity of zinc oxide powder (available from Zinc Corporation, Monaca, Pa.) and a 150.0 gram quantity of expanded perlite (Sil-Kleer™ 27M, available from Silbrico Corporation, Hodgkins, Ill.) were mixed. A 253.44 gram quantity of nickel oxide was then combined with the aluminum hydroxide and zinc oxide to create a dry mix. The wet mix and dry mix were then combined and mixed to form a sorbent slurry.

The sorbent slurry was formed into sorbent particulates using a counter-current spray drier (Niro Atomizer Model 68, available from Niro Atomizer, Inc., Columbia, Md.). The sorbent slurry was charged to the spray drier wherein it was contacted in a particulating chamber with air flowing through the chamber. The resulting spray-dried sorbent particulates were then sieved to remove particles larger than 100 mesh and smaller than 635 mesh. The sieved sorbent particulates were then placed in an oven and dried by ramping the oven temperature at 3° C./min to 150° C. and holding at 150° C. for 1 hour. The dried sorbent particulates were then calcined by ramping the oven temperature at 5° C./min to 635° C. and holding at 635° C. for 1 hour. The resulting nickel-promoted sorbent was designated Sorbent I. The Jet Cup Attrition Index of Sorbent I was 18.7.

Reasonable variations, modifications, and adaptations may be made within the scope of this disclosure and the appended claims without departing from the scope of this invention.

That which is claimed is:

1. A method of making a sorbent composition, said method comprising the steps of:
    (a) contacting expanded, crushed perlite with an acid to thereby provide an acid-treated perlite; and
    (b) combining said acid-treated perlite with a zinc source, an aluminum source, and a promoter metal to thereby provide an unreduced sorbent.

2. A method according to claim 1, wherein said unreduced sorbent comprises said zinc source in an amount in the range of from about 20 to about 60 weight percent and said acid-treated perlite in an amount in the range of from about 10 to about 50 weight percent.

3. A method according to claim 2, wherein said unreduced sorbent comprises said acid-treated perlite in an amount in the range of from about 15 to about 30 weight percent.

4. A method according to claim 2, wherein said zinc source is zinc oxide, wherein said aluminum source is an alumina, and wherein said promoter metal is selected from the group consisting of nickel, cobalt, iron, manganese, copper, zinc, molybdenum, tungsten, silver, antimony, and vanadium.

5. A method according to claim 4, wherein said promoter metal is nickel.

6. A method according to claim 1, wherein step (a) includes increasing the number of hydroxyl groups on the surface of said perlite and wherein step (b) includes chemically binding at least a portion of said acid-treated perlite with at least a portion of said aluminum source.

7. A method according to claim 1, further comprising the step of:
    (c) reducing said unreduced sorbent with a hydrogen-containing reducing fluid to thereby provide a reduced sorbent.

8. A method according to claim 7, wherein step (b) includes mixing said acid-treated perlite, said zinc source, said aluminum source, and a solvent to thereby form a substantially homogenous support mixture.

9. A method according to claim 8, step (b) including particulating said support mixture into support particulates having a mean particle size in the range of from about 10 to about 300 microns.

10. A method according to claim 9, step (b) including impregnating said support particulates with said promoter metal, thereby providing promoted sorbent particulates.

11. A method according to claim 10, step (b) including calcining said promoted sorbent particulates at a temperature in the range of from about 400 to about 1,800° F., thereby providing said unreduced sorbent.

12. A method according to claim 11, wherein during said calcining at least a portion of said zinc source and at least a portion of said promoter metal combine to form an oxidized promoter metal component comprising a substitutional solid metal oxide solution characterized by the formula $M_X Zn_Y O$, wherein M is said promoter metal and X and Y are numerical values in the range of from about 0.01 to about 0.99.

13. A method according to claim 12, wherein said reducing is operable to reduce at least a portion of said substitutional solid metal oxide solution to a substitutional solid metal solution characterized by the formula $M_A Zn_B$, wherein M is said promoter metal and A and B are numerical values in the range of from about 0.01 to about 0.99.

14. A method according to claim 13, wherein said aluminum source is an alumina, said zinc source is zinc oxide, said promoter metal is selected from the group consisting of nickel, cobalt, iron, manganese, copper, zinc, molybdenum, tungsten, silver, antimony, and vanadium, A is in the range of from about 0.70 to about 0.97, B is in the range of from about 0.03 to about 0.30, X is in the range of from about 0.5 to about 0.9, and Y is in the range of from about 0.1 to about 0.5.

15. A method according to claim 14, wherein step (b) includes chemically combining at least a portion of said zinc source and at least a portion of said aluminum source to form a spinel structure similar to zinc aluminate.

16. A method according to claim 15, wherein during said calcining at least a portion of said promoter metal and at least a portion of said zinc aluminate combine to form a promoter metal-zinc aluminate substitutional solid solution characterized by the formula $M_Z Zn_{(1-Z)} Al_2 O_4$, wherein M is said promoter metal and Z is a numerical value in the range of from 0.01 to 0.99.

17. A method according to claim 16, wherein said reduced sorbent comprises said zinc oxide in an amount in the range of from about 20 to about 60 weight percent, said substitutional solid metal solution in an amount in the range of from about 20 to about 60 weight percent, said acid-treated perlite in an amount in the range of from about 10 to about 40 weight percent, and said promoter metal zinc aluminate substitutional solid solution in an amount in the range of from about 5 to about 30 weight percent.

18. A method according to claim 17, wherein said promoter metal is nickel.

19. A sorbent composition comprising:
    expanded, crushed perlite;
    zinc oxide; and
    a reduced-valence promoter metal component,
    wherein said sorbent composition has an Operational Jet Cup Attrition Index value of less than about 15.

20. A sorbent composition according to claim 19, wherein said sorbent composition comprises said perlite in an amount in the range of from about 5 to about 50 weight percent, said zinc oxide in an amount in the range of from about 5 to about 80 weight percent, and said reduced-valence promoter metal component in an amount in the range of from about 5 to about 80 weight percent.

21. A sorbent composition according to claim 20, wherein said reduced-valence promoter metal component comprises a promoter metal selected from the group consisting of nickel, cobalt, iron, manganese, copper, zinc, molybdenum, tungsten, silver, antimony, and vanadium.

22. A sorbent composition according to claim 21, wherein said reduced-valence promoter metal component comprises a substitutional solid solution characterized by the formula $M_A Zn_B$, wherein M is the promoter metal and A and B are each numerical values in the range of from 0.01 to 0.99.

23. A sorbent composition according to claim 22, wherein said promoter metal is nickel, A is in the range of from about 0.70 to about 0.97, and B is in the range of from about 0.03 to about 0.30.

24. A sorbent composition according to claim 23, further comprising an aluminate in an amount in the range of from about 1 to about 50 weight percent.

25. A sorbent composition according to claim 24, wherein said aluminate comprises a promoter metal-zinc aluminate substitutional solid solution characterized by the formula $M_Z Zn_{(1-Z)} Al_2 O_4$, wherein M is said promoter metal and Z is a numerical value in the range of from 0.01 to 0.99.

26. A sorbent composition according to claim 25, wherein said sorbent composition has an Operational Jet Cup Attrition Index value of less than 13.

27. A method of making a sorbent composition, said method comprising the steps of:
(a) reacting a promoter metal-containing compound with a zinc-containing compound under conditions sufficient to form a substitutional solid solution comprising a promoter metal and zinc; and
(b) combining said substitutional solid solution with a zinc source and an aluminum source to thereby provide an unreduced sorbent.

28. A method according to claim 27, wherein said substitutional solid solution is a substitutional solid metal oxide solution characterized by the formula $M_X Zn_Y O$, wherein M is the promoter metal and X and Y are numerical values in the range of from about 0.01 to about 0.99.

29. A method according to claim 28, further comprising the step of:
(c) reducing said unreduced sorbent with a hydrogen-containing reducing stream to thereby provide a reduced sorbent.

30. A method according to claim 29, wherein step (c) includes converting at least a portion of said substitutional solid metal oxide solution to a substitutional solid metal solution characterized by the formula $M_A Zn_B$, wherein M is said promoter metal and A and B are numerical values in the range of from about 0.01 to about 0.99, wherein said reduced sorbent comprises said substitutional solid metal solution in an amount in the range of from about 5 to about 80 weight percent, and wherein said reduced sorbent comprises said zinc source in an amount in the range of from about 5 to about 80 weight percent.

31. A method according to claim 30, wherein said promoter metal is selected from the group consisting of nickel, cobalt, iron, manganese, copper, zinc, molybdenum, tungsten, silver, antimony, and vanadium.

32. A method according to claim 31, wherein said zinc source is zinc oxide, said aluminum source is an alumina, and said promoter metal is nickel.

33. A method according to claim 27, wherein said unreduced sorbent comprises said substitutional solid solution in an amount in the range of from about 15 to about 60 weight percent and said zinc source in an amount in the range of from about 20 to about 60 weight percent.

34. A method according to claim 33, wherein said zinc source is zinc oxide, said aluminum source is an alumina, and said promoter metal is selected from the group consisting of nickel, cobalt, iron, manganese, copper, zinc, molybdenum, tungsten, silver, antimony, and vanadium.

35. A method according to claim 34, wherein step (b) includes combining said substitutional solid solution with said zinc source, said aluminum source, and perlite to form a slurry, spray-drying said slurry to form sorbent particulates, and calcining said sorbent particulates to form said unreduced sorbent.

36. A method according to claim 35, further comprising the step of:
(d) reducing said unreduced sorbent to thereby form a reduced sorbent comprising a substitutional solid metal solution characterized by the formula $M_A Zn_B$, wherein M is said promoter metal and A and B are numerical values in the range of from about 0.01 to about 0.99.

37. A method according to claim 36, wherein said promoter metal is nickel, A is in the range of from about 0.70 to about 0.97, and B is in the range of from about 0.03 to about 0.30.

38. A method according to claim 27, wherein said promoter metal-containing compound is a nickel acetate and said zinc-containing compound is a zinc acetate.

39. A method of making a sorbent composition, said method comprising the steps of:
(a) admixing a solvent, a promoter metal, and an alumina to thereby form a wet mix;
(b) admixing zinc oxide and perlite to thereby form a dry mix;
(c) admixing said wet mix and said dry mix to thereby form a sorbent slurry;
(d) particulating said sorbent slurry to thereby form sorbent particulates;
(e) calcining said sorbent particulates to thereby form calcined sorbent particulates; and
(f) reducing said calcined sorbent particulates to thereby form a reduced sorbent.

40. A method according to claim 39, wherein said promoter metal is selected from the group consisting of nickle, cobalt, iron, manganese, copper, zinc, molybdenum, tungsten, silver, antimony, and vanadium.

41. A method according to claim 40, wherein said promoter metal is nickel.

42. A method according to claim 39, wherein step (e) includes combining at least a portion of said zinc oxide and at least a portion of said promoter metal to thereby form a substitutional solid metal oxide solution characterized by the formula $M_X Zn_Y O$, wherein M is said promoter metal and X and Y are numerical values in the range of from about 0.01 to about 0.99.

43. A method according to claim 42, wherein step (f) includes converting at least a portion of said substitutional solid metal oxide solution into a substitutional solid metal solution characterized by the formula $M_A Zn_B$, wherein M is said promoter metal and A and B are numerical values in the range of from about 0.01 to about 0.99.

44. A method according to claim 43, wherein said promoter metal is selected from the group consisting of nickel, cobalt, iron, manganese, copper, zinc, molybdenum, tungsten, silver, antimony, and vanadium.

45. A method according to claim 44, wherein said promoter metal is nickel, A is in the range of from about 0.70 to about 0.97, B is in the range of from about 0.03 to about 0.30, X is in the range of from about 0.5 to about 0.9, and Y is in the range of from about 0.1 to about 0.5.

46. A method according to claim 39, wherein the pH of said wet mix and said sorbent slurry is maintained below 5.

47. A method of making a sorbent composition, said method comprising the steps of:
   (a) admixing a solvent and an alumina to thereby form a wet mix;
   (b) admixing zinc oxide, an oxide of a promoter metal, and perlite to thereby form a dry mix;
   (c) admixing said wet mix and said dry mix to thereby form a sorbent slurry;
   (d) particulating said sorbent slurry to thereby form sorbent particulates;
   (e) calcining said sorbent particulates to thereby form calcined sorbent particulates; and
   (f) reducing said calcined sorbent particulates to thereby form a reduced sorbent.

48. A method according to claim 47, wherein said promoter metal is selected from the group consisting of nickle, cobalt, iron, manganese, copper, zinc, molybdenum, tungsten, silver, antimony, and vanadium.

49. A method according to claim 48, wherein said oxide of said promoter metal is nickel oxide.

50. A method according to claim 47, wherein step (e) includes combining at least a portion of said zinc oxide and at least a portion of said promoter metal to thereby form a substitutional solid metal oxide solution characterized by the formula $M_XZn_YO$, wherein M is said promoter metal and X and Y are numerical values in the range of from about 0.01 to about 0.99.

51. A method according to claim 50, wherein step (f) includes converting at least a portion of said substitutional solid metal oxide solution into a substitutional solid metal solution characterized by the formula $M_AZn_B$, wherein M is said promoter metal and A and B are numerical values in the range of from about 0.01 to about 0.99.

52. A method according to claim 51, wherein said promoter metal is selected from the group consisting of nickel, cobalt, iron, manganese, copper, zinc, molybdenum, tungsten, silver, antimony, and vanadium.

53. A method according to claim 52, wherein said promoter metal is nickel, A is in the range of from about 0.70 to about 0.97, B is in the range of from about 0.03 to about 0.30, X is in the range of from about 0.5 to about 0.9, and Y is in the range of from about 0.1 to about 0.5.

54. A method according to claim 47, wherein the pH of said wet mix and said sorbent slurry is maintained below 5.

* * * * *